US012585314B2

(12) United States Patent
Bi et al.

(10) Patent No.: US 12,585,314 B2
(45) Date of Patent: Mar. 24, 2026

(54) DISPLAY MODULE AND DISPLAY DEVICE

(71) Applicants: Chengdu BOE Optoelectronics Technology Co., Ltd., Chengdu (CN); BOE Technology Group Co., Ltd., Beijing (CN)

(72) Inventors: Danyang Bi, Beijing (CN); Han Zhang, Beijing (CN); Xiaoliang Fu, Beijing (CN); Xiangdong Wei, Beijing (CN); Yi Zhang, Beijing (CN); Wei Gong, Beijing (CN)

(73) Assignees: CHENGDU BOE OPTOELECTRONICS TECHNOLOGY CO., LTD., Chengdu (CN); BOE TECHNOLOGY GROUP CO., LTD., Beijing (CN)

( * ) Notice: Subject to any disclaimer, the term of this patent is extended or adjusted under 35 U.S.C. 154(b) by 313 days.

(21) Appl. No.: 18/289,377

(22) PCT Filed: Nov. 29, 2022

(86) PCT No.: PCT/CN2022/135175
§ 371 (c)(1),
(2) Date: Nov. 3, 2023

(87) PCT Pub. No.: WO2024/113188
PCT Pub. Date: Jun. 6, 2024

(65) Prior Publication Data
US 2025/0103113 A1 Mar. 27, 2025

(51) Int. Cl.
*G06F 1/00* (2006.01)
*G06F 1/16* (2006.01)
*G06F 1/20* (2006.01)

(52) U.S. Cl.
CPC .............. *G06F 1/203* (2013.01); *G06F 1/163* (2013.01); *G06F 1/1652* (2013.01); *G06F 1/1656* (2013.01)

(58) Field of Classification Search
CPC ........ G06F 1/203; G06F 1/163; G06F 1/1652; G06F 1/1656
(Continued)

(56) References Cited

U.S. PATENT DOCUMENTS 8,605,421 B2 * 12/2013 Verschoor ............. G06F 1/1652
361/679.55
10,481,638 B2 * 11/2019 Yoshizumi ............ G06F 1/1624
(Continued)

FOREIGN PATENT DOCUMENTS

CN 112543585 A 3/2021
CN 113641090 A 11/2021
(Continued)

*Primary Examiner* — Zhengfu J Feng
(74) *Attorney, Agent, or Firm* — XSENSUS LLP

(57) ABSTRACT

A display module, including: a protective cover, a flexible display panel, and a metal heat-dissipation layer. The protective cover includes a main body portion in the shape of a circular plate and a bending portion distributed around the main body portion. The bending portion is fixedly connected to an edge of the main body portion. A light-exit side of the flexible display panel is attached to the protective cover. An orthographic projection of an edge portion of the flexible display panel on the protective cover is within the bending portion. The metal heat-dissipation layer is attached to a side, going away from the protective cover, of the flexible display panel. An orthographic projection of an edge portion of the metal heat-dissipation layer on the protective cover is within the bending portion. The edge portion of the metal heat-dissipation layer has a plurality of hollowed-out grooves arranged in arrays.

20 Claims, 17 Drawing Sheets

(58) Field of Classification Search
USPC ..................................................... 361/679.46
See application file for complete search history.

(56) References Cited

U.S. PATENT DOCUMENTS

| | | | |
|---|---|---|---|
| 10,535,837 B2 * | 1/2020 | Chung | ................... H05K 1/028 |
| 2017/0251562 A1 * | 8/2017 | Yoo | ...................... H05K 5/0247 |
| 2018/0138440 A1 * | 5/2018 | Chung | ................ H10K 59/871 |
| 2019/0377385 A1 * | 12/2019 | Bushnell | ............... G06F 1/1652 |
| 2020/0192431 A1 | 6/2020 | Shin et al. | |
| 2022/0190282 A1 * | 6/2022 | Cabreros | ............... H10K 71/00 |
| 2023/0020481 A1 | 1/2023 | Qin et al. | |

FOREIGN PATENT DOCUMENTS

| | | | |
|---|---|---|---|
| CN | 114241910 A | 3/2022 | |
| CN | 114360388 A | 4/2022 | |
| CN | 114420880 A | 4/2022 | |
| CN | 114512530 A | 5/2022 | |
| CN | 114783299 A | 7/2022 | |
| CN | 114823783 A | 7/2022 | |
| CN | 114842754 A | 8/2022 | |
| CN | 114973971 A | 8/2022 | |
| CN | 115148099 A | 10/2022 | |

* cited by examiner

DISPLAY MODULE AND DISPLAY DEVICE

CROSS-REFERENCE TO RELATED APPLICATION

The present disclosure is a U.S. national stage of international application No. PCT/CN2022/135175, filed on Nov. 29, 2022, the content of which is herein incorporated by reference in its entirety.

TECHNICAL FIELD

The present disclosure relates to the field of display technologies, and in particular, relates to a display module and a display device.

BACKGROUND

Nowadays, a display module with a flexible display panel and a protective cover is typically employed as a display screen of a display device. The flexible display panel has the advantages of being deformability, bendability, and more flexibility over conventional display panels.

SUMMARY

Some embodiments of the present disclosure provide a display module and a display device. The technical solutions are as follows.

According to some embodiments of the present disclosure, a display module is provided. The display module includes:

a protective cover, a flexible display panel, and a metal heat-dissipation layer; wherein the protective cover includes: a main body portion in the shape of a circular plate and a bending portion distributed around the main body portion, the bending portion being fixedly connected to an edge of the main body portion;

a light-exit side of the flexible display panel is attached to the protective cover, and an orthographic projection of an edge portion of the flexible display panel on the protective cover is within the bending portion; and the metal heat-dissipation layer is attached to a side, going away from the protective cover, of the flexible display panel, an orthographic projection of an edge portion of the metal heat-dissipation layer on the protective cover is within the bending portion, and the edge portion of the metal heat-dissipation layer has a plurality of hollowed-out grooves arranged in arrays.

In some embodiments, the hollowed-out groove is disposed on a side, going away from a central portion of the metal heat-dissipation layer, of the edge portion of the metal heat-dissipation layer.

In some embodiments, a width of the hollowed-out groove gradually decreases along a direction from the edge portion to the central portion of the metal heat-dissipation layer.

In some embodiments, the plurality of hollowed-out grooves are in the shape of at least one of a triangle, a trapezoid, or a bow.

In some embodiments, the plurality of hollowed-out grooves are equally spaced around the central portion of the metal heat-dissipation layer.

In some embodiments, an orthographic projection of the hollowed-out groove on the protective cover is outside the main body portion.

In some embodiments, the flexible display panel includes: a first panel portion attached to the main body portion, a second panel portion distributed around the first panel portion, and a third panel portion fixedly connected to a side, going away from the first panel portion, of the second panel portion; wherein a boundary of an orthographic projection of the first panel portion on the protective cover is overlapped with a boundary of the main body portion, an orthographic projection of the second panel portion on the protective cover is within the bending portion, and the third panel portion is configured to be bonded to a driver component.

In some embodiments, the second panel portion includes: a panel bending portion, the panel bending portion being fixedly connected to the third panel portion; and the bending portion includes: a first sub-bending portion and a second sub-bending portion, wherein an extension direction of a curved surface, proximal to of the flexible display panel, of the first sub-bending portion is a curved direction, and an extension direction of a curved surface, proximal to of the flexible display panel, of the second sub-bending portion is a linear direction;

wherein an orthographic projection of the panel bending portion of the second panel portion on the protective cover is at least within the second sub-bending portion, and an orthographic projection of the other portion of the second panel portion on the protective cover is at least within the first sub-bending portion.

In some embodiments, the orthographic projection of the hollowed-out groove on the protective cover is not overlapped with the orthographic projection of the panel bending portion on the protective cover.

In some embodiments, the edge portion of the metal heat-dissipation layer includes: a first edge heat-dissipation portion, wherein an orthographic projection of the first edge heat-dissipation portion on the protective cover is within the orthographic projection of the panel bending portion on the protective cover, and an extension direction of a side, going away from the central portion of the metal heat-dissipation layer, of the first edge heat-dissipation portion is a linear direction.

In some embodiments, the edge portion of the metal heat-dissipation layer further includes: a second edge heat-dissipation portion in addition to the first edge heat-dissipation portion, and the plurality of hollowed-out grooves are disposed on a side, going away from the central portion of the metal heat-dissipation layer, of the second edge heat-dissipation portion.

In some embodiments, the display module further includes: a support layer, the support layer being disposed between the third panel portion and the first panel portion and attached to the third panel portion and the first panel portion;

wherein an orthographic projection of the support layer on the third panel portion is within the third panel portion.

In some embodiments, a side surface, proximal to the panel bending portion, of the support layer is flush with a side surface, proximal to the panel bending portion, of the metal heat-dissipation layer.

In some embodiments, the support layer is acquired by tailoring an auxiliary support film whole-layered adhered to the metal heat-dissipation layer according to a dimension of the third panel portion.

In some embodiments, the auxiliary support film is configured to be adhered to the third panel portion prior to being tailored; and a side surface of the support layer is flush with a side surface of the third panel portion.

In some embodiments, the bending portion further includes: a transition portion between the first sub-bending portion and the second sub-bending portion, wherein a curve surface, proximal to the flexible display panel, of the transition portion is tangent to the curved surface, proximal to the flexible display panel, of the first sub-bending portion, and tangent to the curved surface, proximal to the flexible display panel, of the second sub-bending portion.

In some embodiments, the protective cover includes a central light-transmitting region and an edge light-shielding region disposed on a periphery of the central light-transmitting region, at least a portion of the edge light-shielding region being within the bending portion; and the display module further includes: a light-absorbing ink layer disposed on a side, proximal to the flexible display panel, of the protective cover, the light-absorbing ink layer being within the edge light-shielding region.

In some embodiments, the display module further includes: at least one first alignment structure fixed on a side, going away from the protective cover, of the light-absorbing ink layer and at least one second alignment structure fixed on a side, proximal to the protective cover, of the flexible display panel, the at least one first alignment structure being in correspondence to the at least one second alignment structure;

wherein the first alignment structure and the corresponding second alignment structure are configured to align the protective cover with the flexible display panel prior to the protective cover being attached to the flexible display panel.

In some embodiments, the first alignment structure is made of an ink material, and the first alignment structure and the light-absorbing ink layer are in different colors.

According to some embodiments of the present disclosure, a display device is provided. The display device includes:

a power supply component and a display module, wherein the display module is the display module as described above, and the power supply component is configured to supply power to the display module.

BRIEF DESCRIPTION OF DRAWINGS

For clearer descriptions of the technical solutions in the embodiments of the present disclosure, the following briefly introduces the accompanying drawings to be required in the descriptions of the embodiments. Apparently, the accompanying drawings in the following description show merely some embodiments of the present disclosure, and persons of ordinary skills in the art may still derive other drawings from these accompanying drawings without creative efforts.

Definite embodiments of the present disclosure, which have been illustrated using the above-described accompanying drawings, will be described in further detail hereinafter. These accompanying drawings and textual descriptions are not intended to limit the scope of the present disclosure, but rather to illustrate the concepts of the present disclosure for those skilled in the art by reference to particular embodiments.

DETAILED DESCRIPTION

The present disclosure is described in further detail with reference to the accompanying drawings, to clearly present the objects, technical solutions, and advantages of the present disclosure.

A light-exit side of the flexible display panel in the display module is oriented toward the protective cover, and the flexible display panel is attached to the protective cover, such that the flexible display panel is protected by the protective cover.

However, after the protective cover is attached to the flexible display panel, the acquired display module has a wide overall bezel, and thus a screen-to-body ratio of the display module is low.

Figure 1:
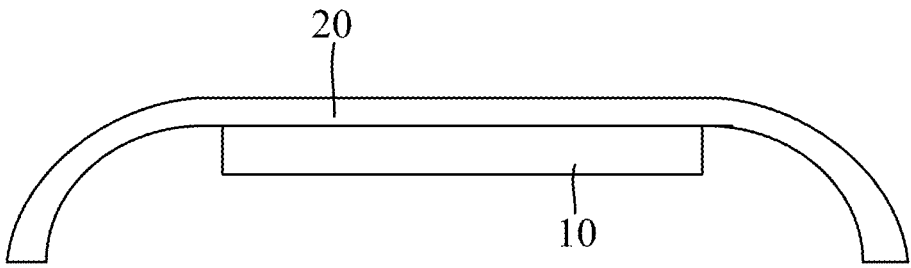
FIG. 1 is a schematic structural diagram of a display module according to some practices.

FIG. 1 is a schematic structural diagram of a display module according to some practices. Referring to FIG. 1 in some practices, a flexible display panel 10 in a display module is typically attached to a planar region in a protective cover 20. However, in this case, a space utilization of a bending region in the protective cover 20 is insufficient. As a result, an overall bezel of the display module is wide, which is not conducive to a narrow bezel design of the display module.

Figure 2:
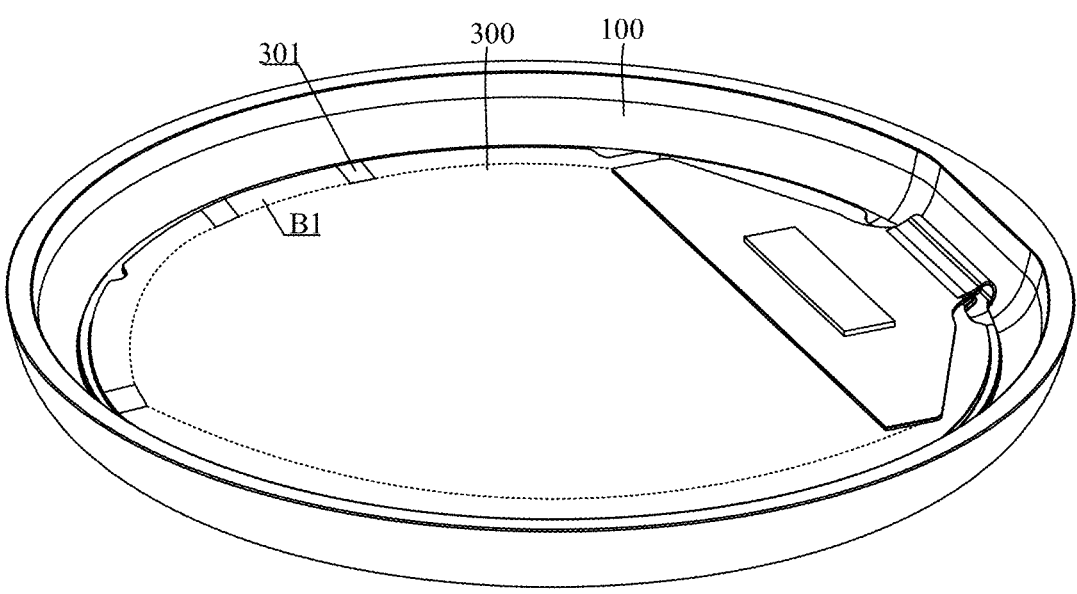
FIG. 2 is a schematic structural diagram of a display module according to some embodiments of the present disclosure.
Figure 3:
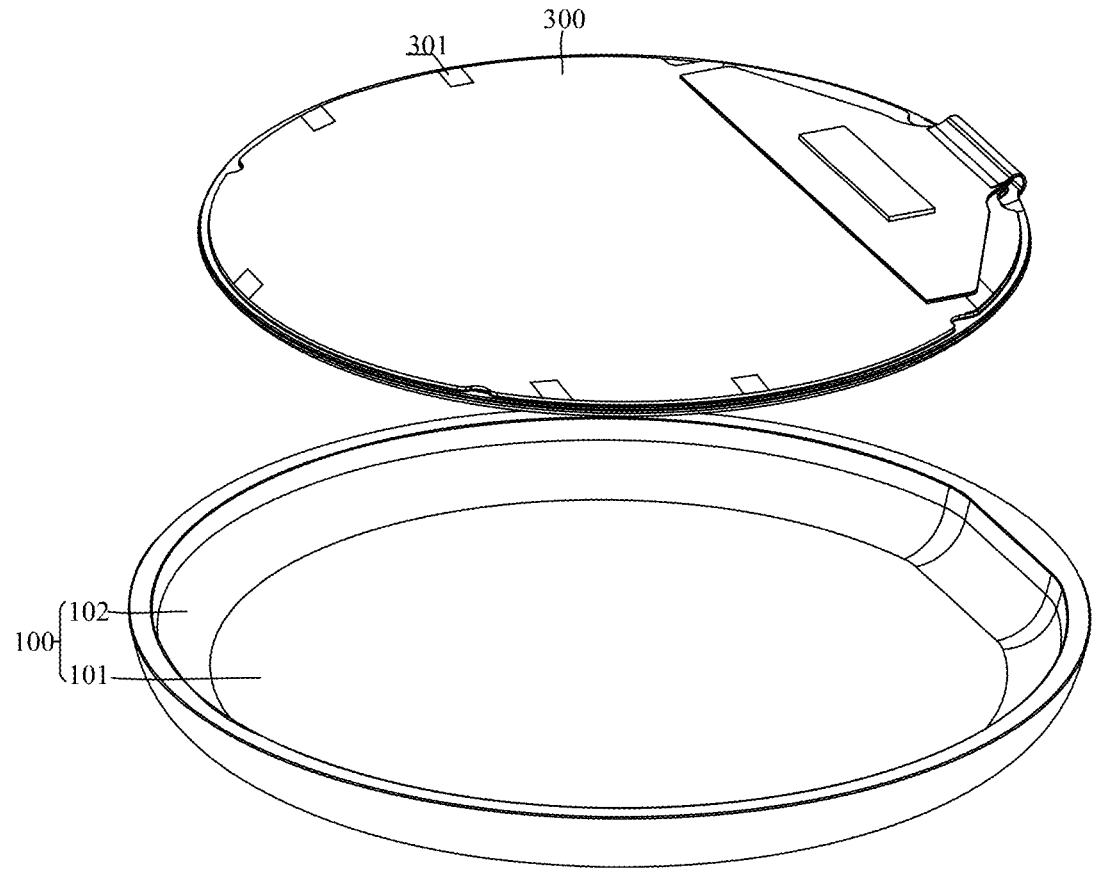
FIG. 3 is an exploded schematic diagram of the display module illustrated in FIG. 2.

FIG. 2 is a schematic structural diagram of a display module according to some embodiments of the present disclosure. FIG. 3 is an exploded schematic diagram of the display module illustrated in FIG. 2. Referring to FIG. 2 and FIG. 3, The display module 000 includes a protective cover 100, a flexible display panel 200, and a metal heat-dissipation layer 300.

The protective cover 100 in the display module 000 includes a main body portion 101 in the shape of a circular plate and a bending portion 102 distributed around the main body portion 101, wherein the bending portion 102 is fixedly connected to an edge of the main body portion 101.

Figure 4:
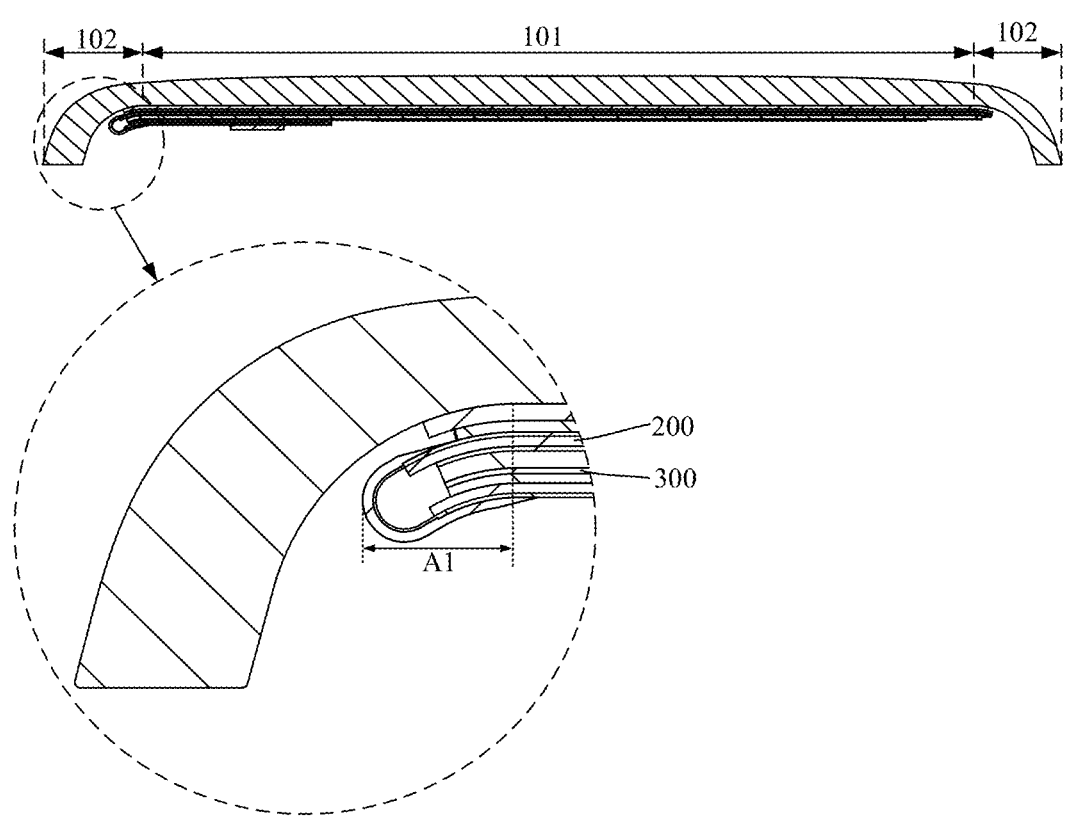
FIG. 4 is a cross-sectional view of a display module according to some embodiments of the present disclosure.

FIG. 4 is a cross-sectional view of a display module according to some embodiments of the present disclosure. Referring to FIG. 4, a light-exit side of the flexible display panel 200 in the display module 000 is attached to the protective cover 100, and an orthographic projection of an edge portion A1 of the flexible display panel 200 on the protective cover 100 is within the bending portion 102 of the protective cover 100. In some embodiments, the flexible display panel 200 refers to a bendable display panel. In some embodiments, the flexible display panel 200 is a display panel that includes an organic light-emitting diode (OLED).

The metal heat-dissipation layer 300 in the display module 000 is attached to a side, going away from the protective cover 100, of the flexible display panel 200. An orthographic projection of an edge portion B1 of the metal heat-dissipation layer 300 on the protective cover 100 is within the bending portion 102 of the protective cover 100, and the edge portion B1 of the metal heat-dissipation layer 300 has a plurality of hollowed-out grooves 301 arranged in arrays.

In some embodiments, the protective cover 100 in the display module 000 is arranged on the light-exit side of the flexible display panel 200. Because the orthographic projection of the edge portion A1 of the flexible display panel 200 on the protective cover 100 is within the bending portion 102 of the protective cover 100, the edge portion A1 of the flexible display panel 200 is capable of being extended into the bending portion 102 of the protective cover 100. Therefore, after the flexible display panel 200 is attached to the protective cover 100, the acquired display module 000 has a narrow overall bezel and a large screen-to-body ratio, and thus the user experience is improved. In the case that the display module 000 is integrated into the display device, the overall bezel of the display device is caused to be small, which improves a modifying effect of the bezel to the display device. In addition, the metal heat-dissipation layer 300 is arranged on the side, going away from the protective cover 100, of the flexible display panel 200, and the edge portion of the metal heat-dissipation layer 300 is within the bending portion of the protective cover. Therefore, after the edge portion B1 of the metal heat-dissipation layer 300 extends into the bending portion 102 of the protective cover 100, the plurality of hollowed-out groves 301 arranged in the edge portion B1 of the metal heat-dissipation layer 300 effectively reduce a probability of the edge portion B1 of the metal heat-dissipation layer 300 generating an undesirable phenomenon of wrinkles, such that an overall flatness of the flexible display panel 200 attached to the metal heat-dissipation layer 300 is good.

In summary, some embodiments of the present disclosure provide a display module, including: the protective cover, the flexible display panel, and the metal heat-dissipation layer. The protective cover in the display module is arranged on the light-exit side of the flexible display panel. Because the orthographic projection of the edge portion of the flexible display panel on the protective cover is within the bending portion of the protective cover, the edge portion of the flexible display panel is capable of being extended into the bending portion of the protective cover. In this way, after the flexible display panel is attached to the protective cover, the overall bezel of the acquired display module is narrow and the large screen-to-body ratio is large, which improves the user experience. After the display module is integrated into the display device, the overall bezel of the display device is caused to be small, such that an effect of modifying the display device is improved. In addition, the metal heat-dissipation layer is arranged on the side, going away from the protective cover, of the flexible display panel, and the edge portion of the metal heat-dissipation layer is within the bending portion of the protective cover. Therefore, after the edge portion of the metal heat-dissipation layer extends into the bending portion of the protective cover, the plurality of hollowed-out grooves arranged in the edge portion of the metal heat-dissipation layer effectively reduce the probability of the edge portion of the metal heat-dissipation layer generating the undesirable phenomenon of wrinkles, such that the overall flatness of the flexible display panel that is attached to the metal heat-dissipation layer is ensured to be good.

Figure 5:
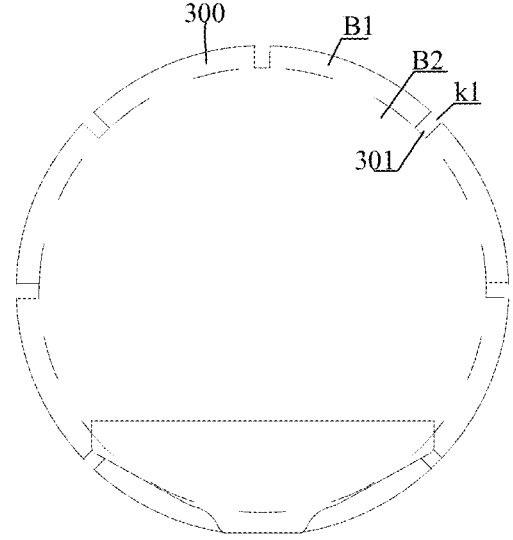
FIG. 5 is a distribution schematic diagram of a hollowed-out groove in a metal heat-dissipation layer according to some embodiments of the present disclosure.

FIG. 5 is a distribution schematic diagram of a hollowed-out groove in a metal heat-dissipation layer according to some embodiments of the present disclosure. In some embodiments, referring to FIG. 5, the hollowed-out groove 301 in the metal heat-dissipation layer 300 is disposed on a side, going away from a central portion B2 of the metal heat-dissipation layer 300, of the edge portion B1 of the metal heat-dissipation layer 300. In some embodiments, the plurality of hollowed-out grooves 301 are all disposed on the side, going away from the central portion B2 of the metal heat-dissipation layer 300, of the edge portion B1 of the metal heat-dissipation layer 300. In this case, by arranging the hollowed-out groove 301 on the side, going away from the central portion B2 of the metal heat-dissipation layer 300, of the edge portion B1 of the metal heat-dissipation layer 300, the hollowed-out groove 301 has an opening k1 disposed on a side surface of the edge portion B1 of the metal heat-dissipation layer 300. In this way, the probability of the undesirable phenomenon of wrinkles occurring on the edge portion B1 of the metal heat-dissipation layer 300 extending into the bending portion 102 of the protective cover 100 is further reduced by the means of the plurality of hollowed-out grooves 301.

Figure 6:
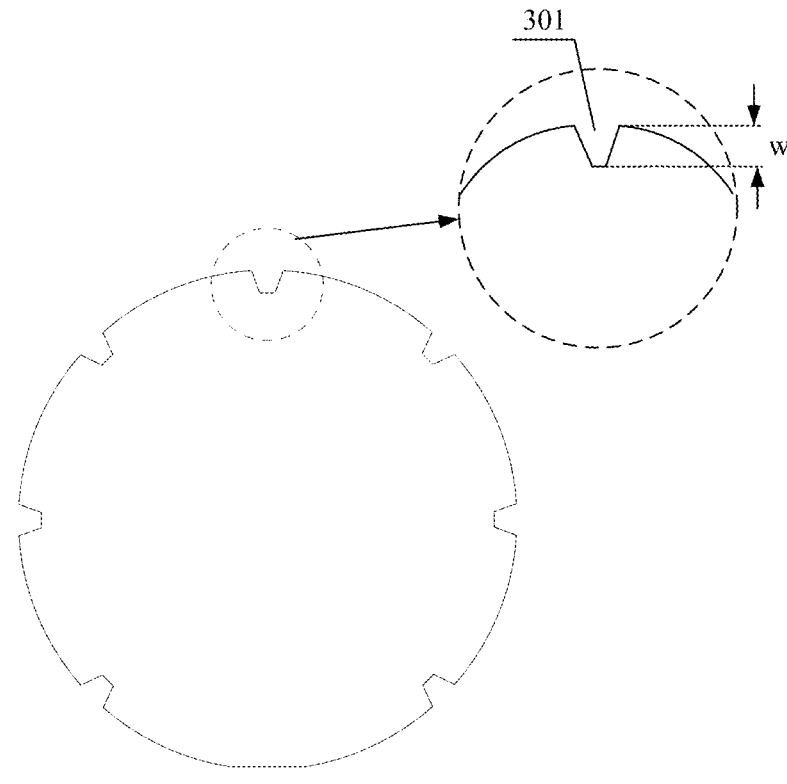
FIG. 6 is a distribution schematic diagram of another hollowed-out groove in a metal heat-dissipation layer according to some embodiments of the present disclosure.

FIG. 6 is a distribution schematic diagram of another hollowed-out groove in a metal heat-dissipation layer according to some embodiments of the present disclosure. In the present disclosure, referring to FIG. 6, a width w of each of the hollowed-out groves 301 in the edge portion B1 of the metal heat-dissipation layer 300 is gradually reduced along a direction from the edge portion B1 of the metal heat-dissipation layer 300 to the central portion B2 of the metal heat-dissipation layer 300. In this case, by the plurality of hollowed-out groves 301, in one aspect, the probability of the undesirable phenomenon of a large degree of wrinkles occurring on a peripheral portion of the edge portion B1 of the metal heat-dissipation layer 300 is ensured to be low, and in another aspect, the other portion of the edge portion B1 of the metal heat-dissipation layer 300 other than the peripheral portion, in the case of having a small degree of wrinkles, is ensured to have a large effective support area and a large heat-dissipation area to the flexible display panel 200, and in still another aspect, it is convenient for the edge portion B1 of the metal heat-dissipation layer 300 to be attached to the edge portion A1 of the flexible display panel 200.

In some embodiments, as illustrated in FIG. 5 and FIG. 6, the plurality of hollowed-out grooves 301 in the edge portion B1 of the metal heat-dissipation layer 300 are in the shape of at least one of a triangle, a trapezoid, or a bow. In some embodiments, the plurality of hollowed-out grooves 301 in the edge portion B1 of the metal heat-dissipation layer 300 are all in the shape of a triangle; or, the plurality of hollowed-out grooves 301 in the edge portion B1 of the metal heat-dissipation layer 300 are all in the shape of a trapezoid; or, the plurality of hollowed-out grooves 301 in the edge portion B1 of the metal heat-dissipation layer 300 are all in the shape of a bow; or, a portion of the plurality of hollowed-out grooves 301 in the edge portion B1 of the metal heat-dissipation layer 300 are in the shape of a triangle, and another portion of the hollowed-out grooves 301 are in the shape of a trapezoid; or, a portion of the plurality of hollowed-out grooves 301 in the edge portion B1 of the metal heat-dissipation layer 300 are in the shape of a triangle, and another portion of the hollowed-out grooves 301 are in the shape of a bow; or, a portion of the plurality of hollowed-out grooves 301 in the edge portion B1 of the metal heat-dissipation layer 300 are in the shape of a trapezoid, and another portion of the hollowed-out grooves 301 are in the shape of a bow; or, the plurality of hollowed-out grooves 301 in the edge portion B1 of the metal heat-dissipation layer 300 are in the shapes of a triangle, a trapezoid, and a bow, which is not limited herein.

It should be noted that the number of hollowed-out grooves 301 of different shapes in the edge portion B1 of the metal heat-dissipation layer 300 are the same or different, which is not limited herein. It should be also noted that in other possible embodiments, the hollowed-out grooves 301 in the edge portion B1 of the metal heat-dissipation layer 300 are in other shapes, such as a square, which is not limited herein. In the present disclosure, in the case that the hollowed-out groove 301 in the edge portion B1 of the metal heat-dissipation layer 300 is in the shape of a triangle, the triangle is an isosceles triangle. In the case that the hollowed-out groove 301 in the edge portion B1 of the metal heat-dissipation layer 300 is in the shape of a trapezoid, the trapezoid is an isosceles trapezoid.

In some embodiments, as illustrated in FIG. 5 and FIG. 6, the plurality of hollowed-out grooves 301 in the edge portion B1 of the metal heat-dissipation layer 300 are equally spaced around the central portion B2 of the metal heat-dissipation layer 300. In this case, by arranging the plurality of hollowed-out grooves 301 to be equally spaced around the central portion B2 of the metal heat-dissipation layer 300, the force applied to the edge portion B1 of the metal heat-dissipation layer 300 is ensured to be uniform when attached to the edge portion A1 of the flexible display panel 200, such that a securing process between the edge portion B1 of the metal heat-dissipation layer 300 and the edge portion A1 of the flexible display panel 200 is ensured to be good. In addition, by the plurality of equally spaced hollowed-out grooves 301, the flatness of the edge portion B1 of the metal heat-dissipation layer 300 at various positions is ensured to be uniform, such that the flatness of the edge portion A1 of the flexible display panel 200 is uniform. In this way, the display module 000 to have a good appearance after the flexible display panel 200 is attached to the metal heat-dissipation layer 300. It should be noted that in other possible embodiments, distances between adjacent two hollowed-out grooves 301 in the plurality of hollowed-out grooves 301 are different; or, the distances between adjacent two hollowed-out grooves 301 in a portion of the plurality of hollowed-out grooves 301 are different, and the distances between adjacent two hollowed-out grooves 301 in the other portion of the plurality of hollowed-out grooves 301 are the same, which is not limited herein.

In some embodiments, as illustrated in FIG. 2, FIG. 5, and FIG. 6, an orthographic projection of the hollowed-out groove 301 of the edge portion B1 of the metal heat-dissipation layer 300 on the protective cover 100 is outside the main body portion 101 of the protective cover 100. In this case, by arranging the orthographic projection of the hollowed-out groove 301 of the edge portion B1 of the metal heat-dissipation layer 300 on the protective cover 100 to be outside the main body portion 101 of the protective cover 100, the central portion B2 of the metal heat-dissipation layer 300 is not provided with the hollowed-out grooves 301. In this way, after the central portion B2 of the metal heat-dissipation layer 300 is attached to the flexible display panel 200, the central portion B2 of the metal heat-dissipation layer 300 supports and protects the flexible display panel 200 well, and the central portion B2 of the metal heat-dissipation layer 300 has a good heat-dissipation effect on the flexible display panel 200. In the present disclosure, a boundary of an orthographic projection of the central portion B2 of the metal heat-dissipation layer 300 on the protective cover 100 is overlapped with a boundary of the main body portion 101 of the protective cover 100.

Figure 7:
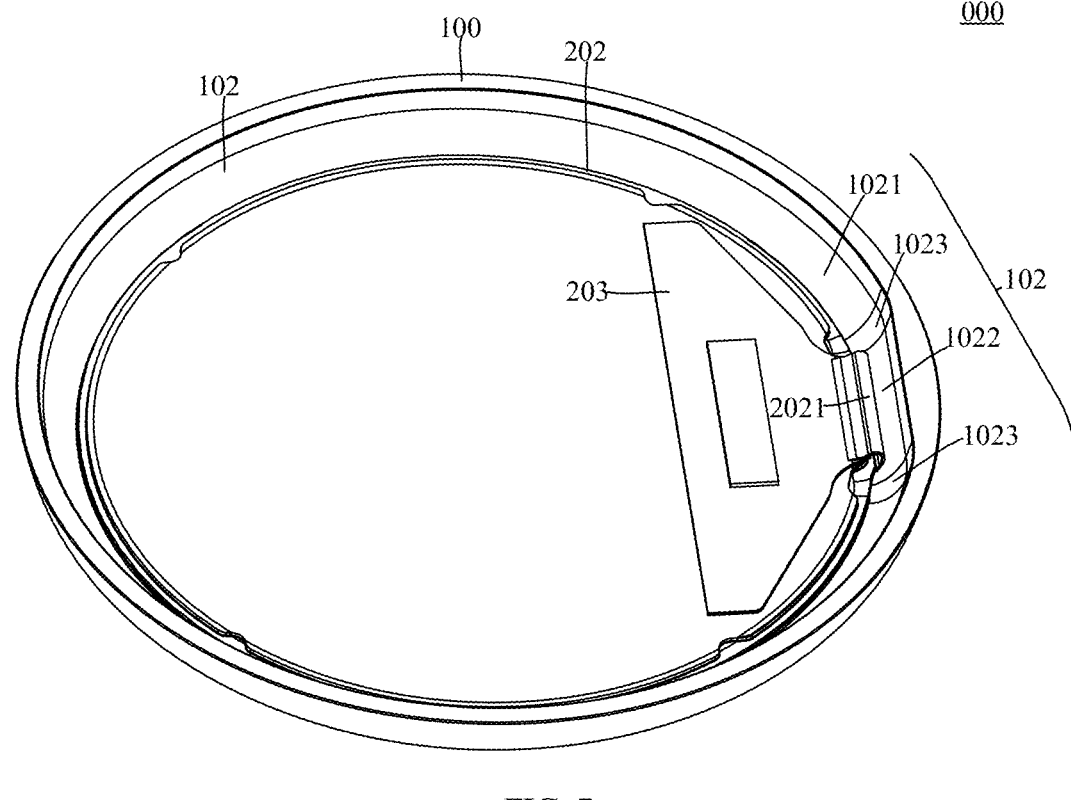
FIG. 7 is a schematic structural diagram of another display module according to some embodiments of the present disclosure.
Figure 8:
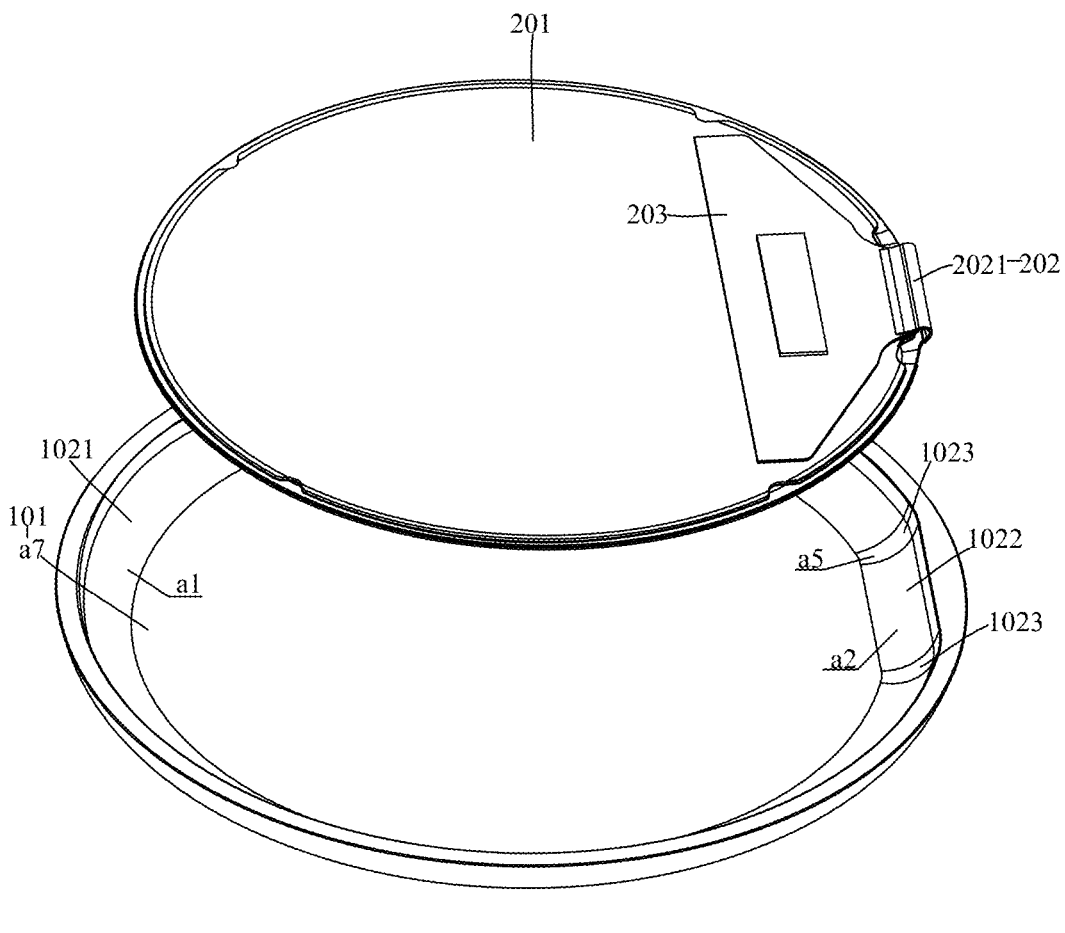
FIG. 8 is an exploded schematic diagram of the display module illustrated in FIG. 7.
Figure 9:
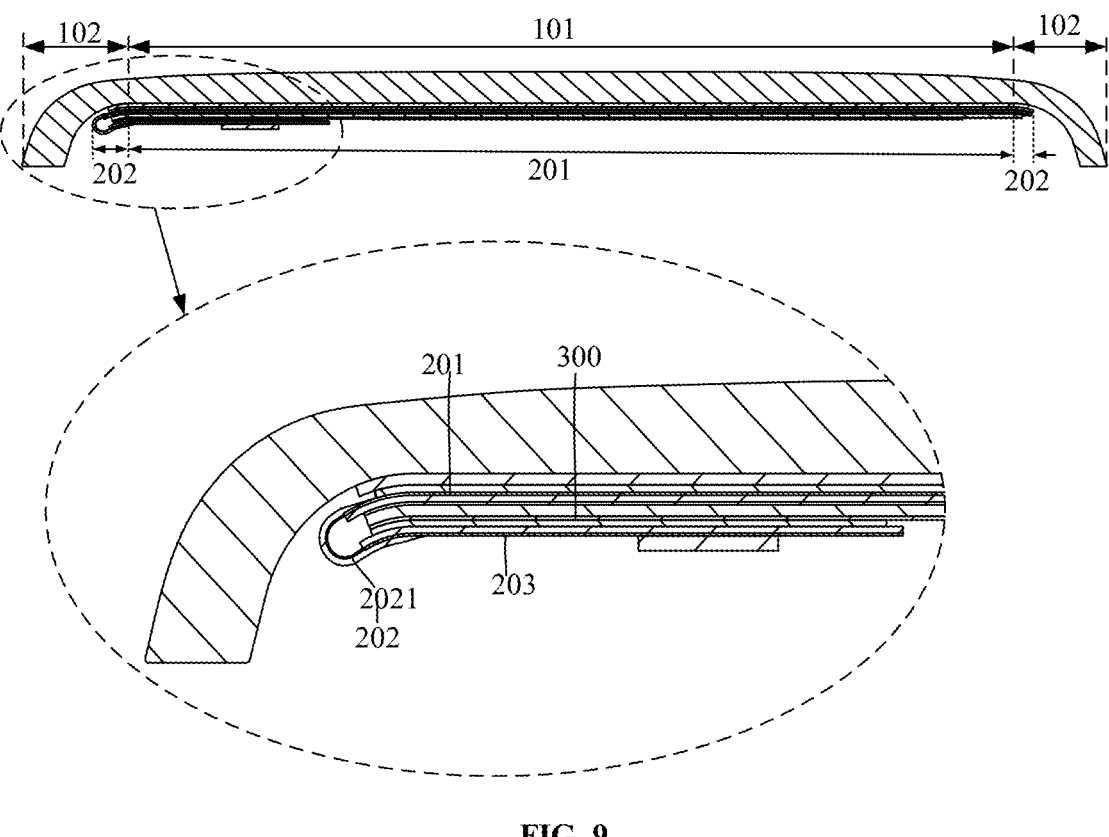
FIG. 9 is a cross-sectional view of the display module illustrated in FIG. 7.

FIG. 7 is a schematic structural diagram of another display module according to some embodiments of the present disclosure. FIG. 8 is an exploded schematic diagram of the display module illustrated in FIG. 7. FIG. 9 is a cross-sectional view of the display module illustrated in FIG. 7. In some embodiments, referring to FIG. 7, FIG. 8, and FIG. 9, the flexible display panel 200 in the display module 000 includes a first panel portion 201 attached to the main body portion 101 of the protective cover 100, a second panel portion 202 distributed around the first panel portion 201, and a third panel portion 203 fixedly connected to a side, going away from the first panel portion 201, of the second panel portion 202. A boundary of an orthographic projection of the first panel portion 201 of the flexible display panel 200 on the protective cover 100 is overlapped with the boundary of the main body portion 101 of the flexible display panel 200. An orthographic projection of the second panel portion 202 of the flexible display panel 200 on the protective cover 100 is within the bending portion 102 of the protective cover 100. The third panel portion 203 is configured to be bonded to a driver component (not illustrated in the figures). In this case, the first panel portion 201 of the flexible display panel 200 is attached to the main body portion 101 of the protective cover 100, and the orthographic projection of the second panel portion 202 on the protective cover 100 is within the bending portion 102 of the protective cover 100, and thus it is possible to extend the second panel portion 202 of the flexible display panel 200 into the bending portion 102 of the protective cover 100. As a result, after the flexible display panel 200 is attached to the protective cover 100, the acquired display module 000 has a narrow overall bezel and a large screen-to-body ratio, such that the user experience is improved.

In addition, the boundary of the orthographic projection of the first panel portion 201 of the flexible display panel 200 on the protective cover 100 is overlapped with the boundary of the main body portion 101 of the protective cover 100. In this way, by arranging the boundary of the first panel portion 201 of the flexible display panel 200 to be overlapped with the boundary of the main body portion 101 of the protective cover 100, to be attached to the main body portion 101, and to be in the shape of a circle, the connection between the flexible display panel 200 and the main body portion 101 of the protective cover 100 is stable, such that an assembly yield of the display module 000 is good. It should be noted that, in other possible embodiments, the main body portion 101 of the protective cover 100 is a plate structure in the shape of a square, and the first panel portion 201 of the flexible display panel 200 attached to the main body portion 101 is in the shape of a square or a circle, which is not limited herein.

In some embodiments, by pad bending the flexible display panel 200, the third panel portion 203 of the flexible display panel 200 is made to be bonded to the driver component, such that the bezel of the display module 000 narrows, and thus a narrow bezel design of the display module is achieved. In the present disclosure, the third panel portion 203 of the flexible display panel 200 is disposed at a backside of the first panel portion 201 and arranged parallel to the first panel portion 201. After the display module 000 is integrated into the display device, the third panel portion 203 is configured to be bonded to the driver component, such that the driver component drives the flexible display panel 200 in the display module 000 to display images. In some embodiments, the driver component includes a driver integrated circuit (Driver IC) and a circuit board (not illustrated in the figures).

In some embodiments, as illustrated in FIG. 7, FIG. 8, and FIG. 9, both the bending portion 102 of the protective cover 100 and the second panel portion 202 of the flexible display panel 200 are annular. In this case, by arranging the bending portion 102 of the protective cover 100 in an annular shape, the annular bending portion 102 is matched with the main body portion 101 which is in the shape of a circular plate. In addition, by arranging the second panel portion 202 of the flexible display panel 200 in an annular shape, the annular second panel portion 202 is matched with the annular bending portion 102 of the protective cover 100. In this way, in the case that the orthographic projection of the second panel portion 202 of the flexible display panel 200 on the protective cover 100 is within the bending portion 102 of the protective cover 100, the appearance after the second panel portion 202 is attached to the bending portion 102 is good, such that the user experience is improved.

Figure 10:
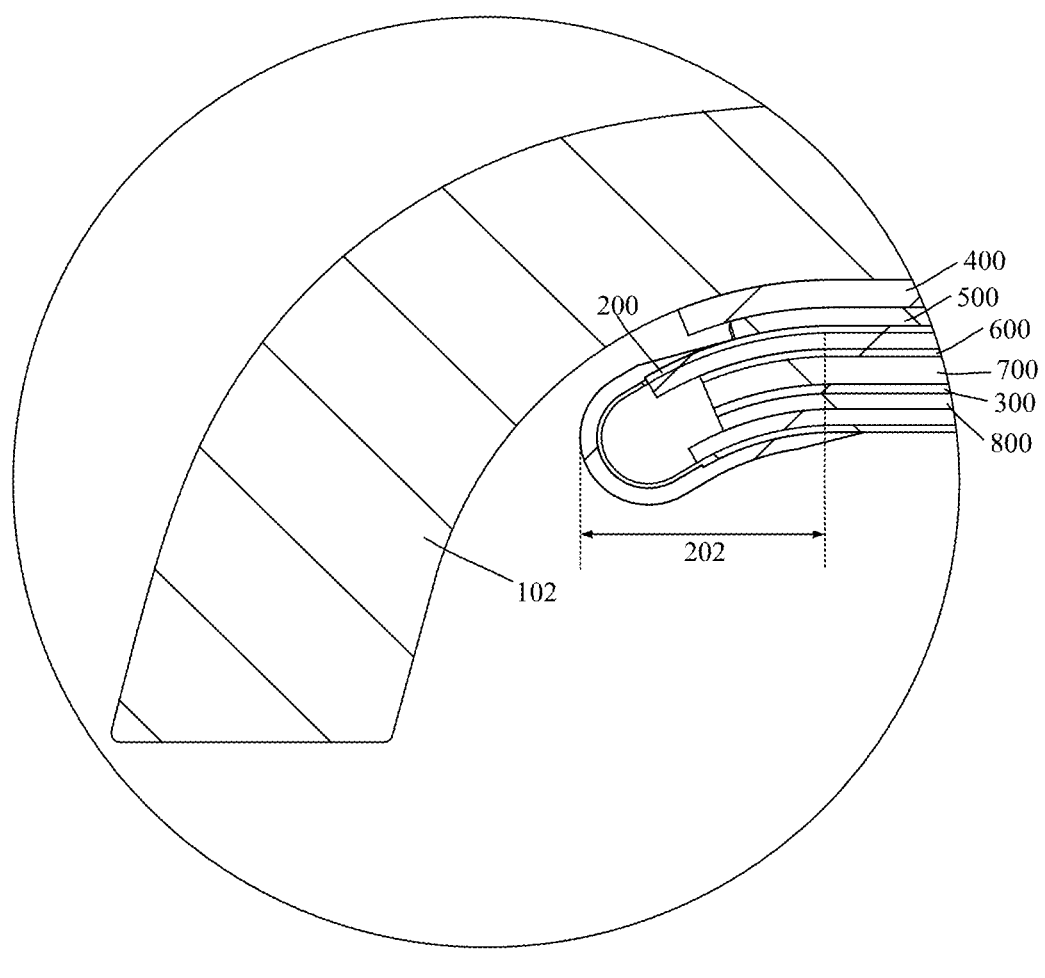
FIG. 10 is a partially schematic structural diagram of a display module according to some embodiments of the present disclosure.

FIG. 10 is a partially schematic structural diagram of a display module according to some embodiments of the present disclosure. In some embodiments, referring to FIG. 10, at least a portion of the second panel portion 202 of the flexible display panel 200 is attached to the bending portion 102 of the protective cover 100. In this case, by arranging the at least portion of the second panel portion 202 of the second panel portion 202 to be attached to the bending portion 102 of the protective cover 100, the connection between the flexible display panel 200 and the protective cover 100 is further made to be more stable. In some embodiments, a portion of the second panel portion 202 of the flexible display panel 200 is attached to the bending portion 102 of the protective cover 100. Alternatively, all of the second panel portion 202 is attached to the bending portion 101 of the protective cover 100. In the present disclosure, the display module 000 further includes an optical clear adhesive (OCA) layer 400 between the protective cover 100 and the flexible display panel 200, and a polarizer 500. The OCA layer 400 is configured to attach the flexible display panel 200 to the protective cover 100. One side of the OCA layer 400 is adhered to the protective cover 100, and the other side is adhered to the polarizer 500. A side, going away from the OCA layer 400, of the polarizer 500 is in contact with the flexible display panel 200. An orthographic projection of the OCA layer 400 on the protective cover 100 is within the bending portion 102 of the protective cover 100, and an orthographic projection of the polarizer 500 on the protective cover 100 is also within the bending portion 102 of the protective cover 100. The polarizer 500 reduces an exit amount that external light entering the flexible display panel 200 exits from the light-exit surface of the flexible display panel 200 after being reflected by an internal structure of the flexible display panel 200.

In some embodiments, as illustrated in FIG. 7 and FIG. 8, the second panel portion 202 of the flexible display panel 200 includes a panel bending portion 2021, which is fixedly connected to the third panel portion 203 of the flexible display panel 200. The bending portion 102 of the protective cover 100 includes a first sub-bending portion 1021 and a second sub-bending portion 1022. An extension direction of a curved surface a1, proximal to the flexible display panel 200, of the first sub-bending portion 1021 is curved, and an extension direction of a curved surface a2, proximal to the flexible display panel 200, of the second sub-bending portion 1022 is linear. An orthographic projection of the panel bending portion 2021 of the second panel portion 202 on the protective cover 100 is at least within the second sub-bending portion 1022, and an orthographic projection of the other portion of the second panel portion 202 on the protective cover 100 is at least within the first sub-bending portion 1021. In this case, by arranging the extension direction of the curved surface a2, proximal to the flexible display panel 200, of the second sub-bending portion 1022 of the protective cover 100 to be linear, in the case that the orthographic projection of the panel bending portion 2021 of the second panel portion 202 on the protective cover 100 is within the second sub-bending portion 1022, the panel bending portion 2021 of the second panel portion 202 is not be subjected to full-curvature compression. That is, the undesirable phenomenon of the panel bending portion 2021 of the second panel portion 202 generating compression wrinkles is effectively reduced, and thus the appearance form of the panel bending portion 2021 of the second panel portion 202 is ensured to be good. In the present disclosure, it is possible to arrange an entirety of the orthographic projection of the panel bending portion 2021 of the second panel portion 202 on the protective cover 100 to be within the second sub-bending portion 1022 of the protective cover 100. In this way, the panel bending portion 2021 of the second panel portion 202 is further ensured not to be subjected to the undesirable phenomenon of full-curvature compression.

Figure 11:
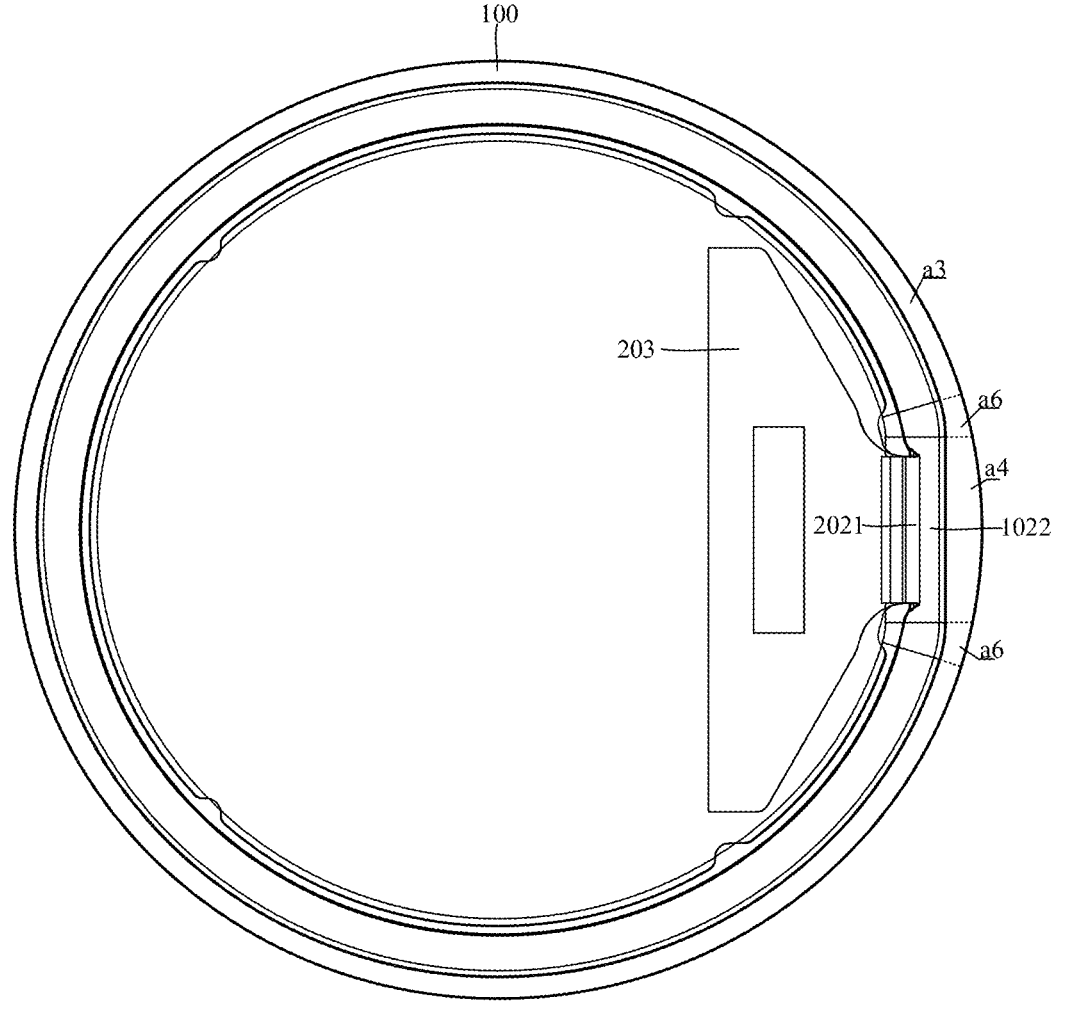
FIG. 11 is a top view of the display module illustrated in FIG. 7.

FIG. 11 is a top view of the display module illustrated in FIG. 7. In the present disclosure, referring to FIG. 7, FIG. 8, and FIG. 11, in the case that the orthographic projection of the panel bending portion 2021 of the second panel portion 202 on the protective cover 100 is all within the second sub-bending portion 1022, a part of the orthographic projection of the other portion of the second panel portion 202 on the protective cover 100 is within the first sub-bending portion 1021, and another part is within the second sub-bending portion 1022. In this way, in the case that a part of the orthographic projection of the other portion of the second panel portion 202 on the protective cover 100 is within the second sub-bending portion 1022, a probability of generating air bubbles during the adhering process of the OCA layer 300 is effectively reduced by adhering this part of the second panel portion 202 to the second sub-bending portion 1022 by the OCA layer 300. In some embodiments, the curved surface a1, proximal to the flexible display panel 200, of the first sub-bending portion 1021 is a circular curved surface, and the curved surface a2, proximal to the flexible display panel 200, of the second sub-bending portion 1022 is also a circular curved surface.

In some embodiments, as illustrated in FIG. 11, a side, going away from the main body portion 101, of the first sub-bending portion 1021 of the protective cover 100 is a first table surface a3, and a side, going away from the main body portion 101, of the second sub-bending portion 1022 is a second table surface a4. This first table surface a3 and the second table surface a4 are coplanar, and a width of the first table surface a3 is smaller than that of the second table surface a4. In this case, by arranging the first table surface a3, going away from the main body portion 101, of the first sub-bending portion 1022 of the protective plate 100 and the second table surface a4, going away from the main body portion 101, of the second sub-bending portion 1022 to be coplanar and the width of the first table surface a3 to be smaller than the width of the second table surface a4, the curved surface a2, proximal to the flexible display panel 200, of the second sub-bending portion 1022 is a cylindrical surface. In some embodiments, as illustrated in FIG. 11, the width of the second table surface a4, going away from the main body portion 101, of the second sub-bending portion 1022 is gradually reduced along a direction from a center of the second table surface a4 to both ends thereof.

Figure 12:
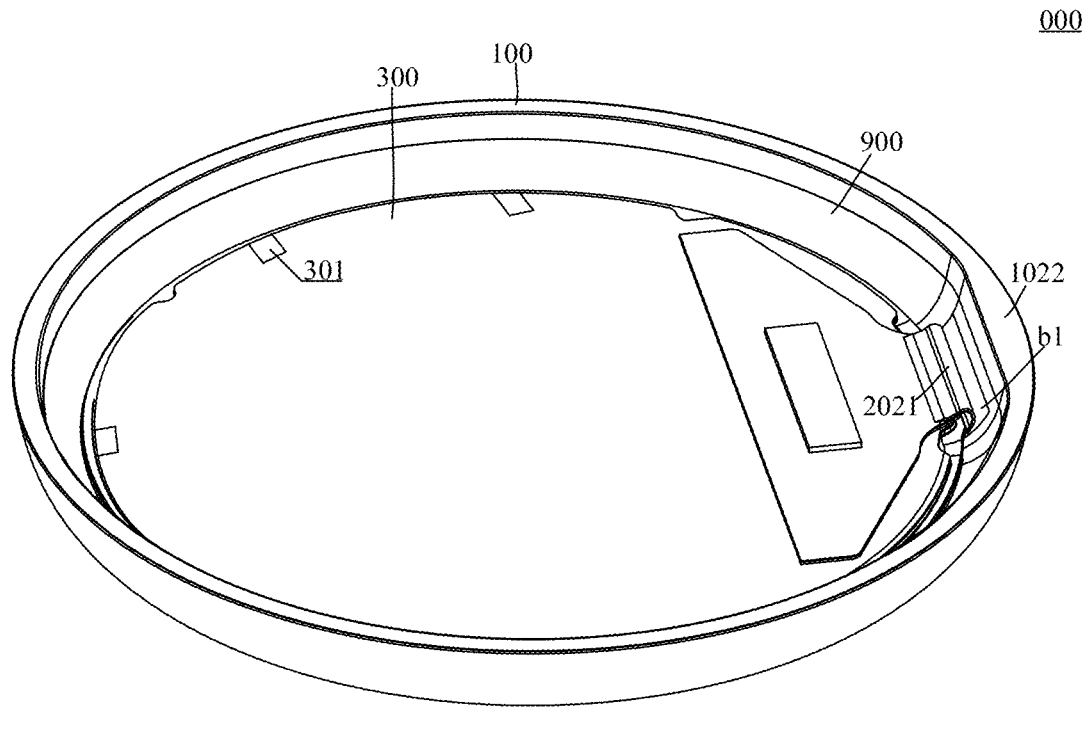
FIG. 12 is a schematic structural diagram of yet another display module according to some embodiments of the present disclosure.
Figure 13:
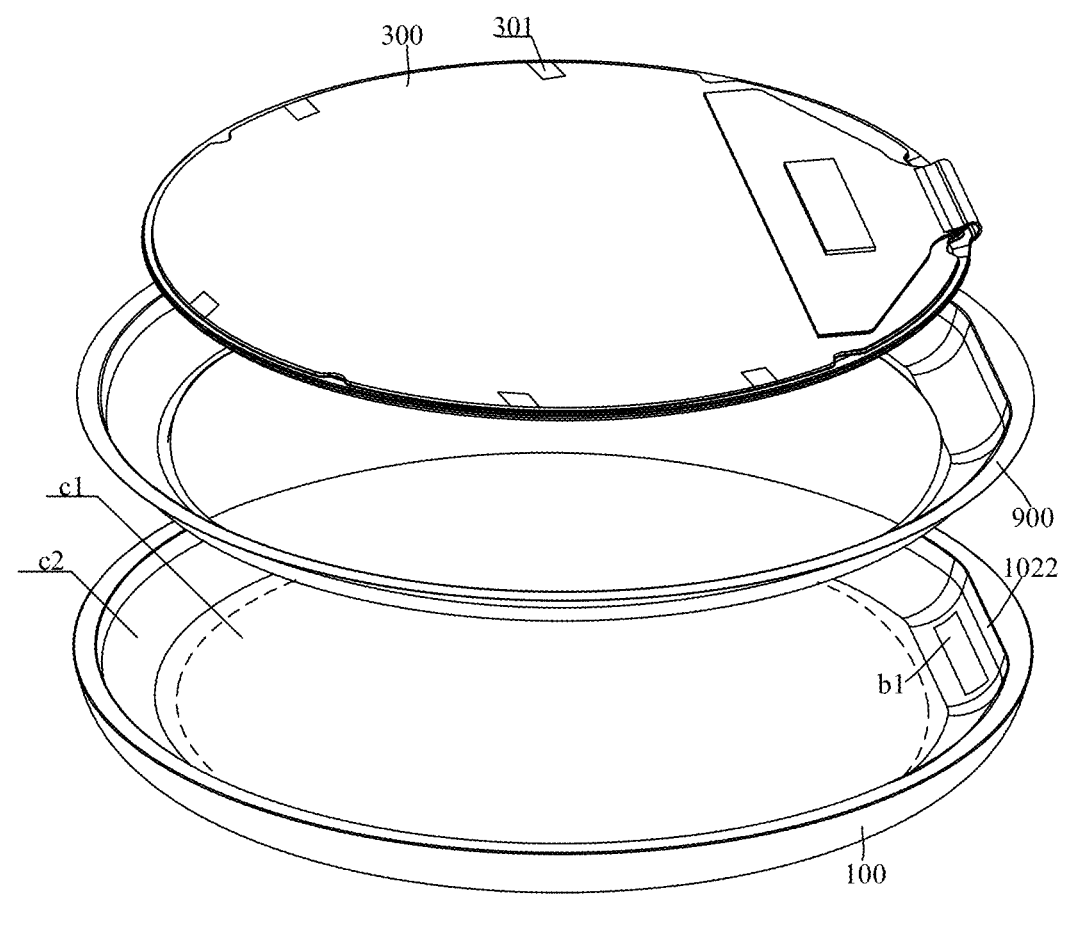
FIG. 13 is an exploded schematic diagram of the display module illustrated in FIG. 12.

FIG. 12 is a schematic structural diagram of yet another display module according to some embodiments of the present disclosure. FIG. 13 is an exploded schematic diagram of the display module illustrated in FIG. 12. In some embodiments, referring to FIG. 2, FIG. 12, and FIG. 13, the orthographic projection of the hollowed-out groove 301 in the edge portion B1 of the metal heat-dissipation layer 300 on the protective cover 100 is not overlapped with the orthographic projection of the panel bending portion 2021 of the second panel portion 202 on the protective cover 100. In this case, by arranging the orthographic projection of the hollowed-out groove 301 on the protective cover 100 to be not overlapped with the orthographic projection of the panel bending portion 2021 of the second panel portion 202 on the protective cover 100, there is no need to arrange the hollowing groove 301 within a region, attached to the panel bending portion 2021 of the second panel portion 202, of the edge portion B1 of the metal heat-dissipation layer 300. Because an orthographic projection of the region, attached to the panel bending portion 2021 of the second panel portion 202, of the edge portion B1 of the metal heat-dissipation layer 300 is within the second sub-bending portion 1022, this region is not subjected to full-curvature compression, such that the probability of wrinkles occurring to the region, attached to the panel bending portion 2021 of the second panel portion 202, of the edge portion B1 of the metal heat-dissipation layer 300 is low. In addition, because the region, attached to the panel bending portion 2021 of the second panel portion 202, of the edge portion B1 of the metal heat-dissipation layer 300 is not provided with the hollowed-out groove 301, this portion of the metal heat-dissipation layer 300 is ensured to have a large contact area with the flexible display panel 200, which has a great effect of supporting and protecting the flexible display panel 200.

Figures 14, 15:
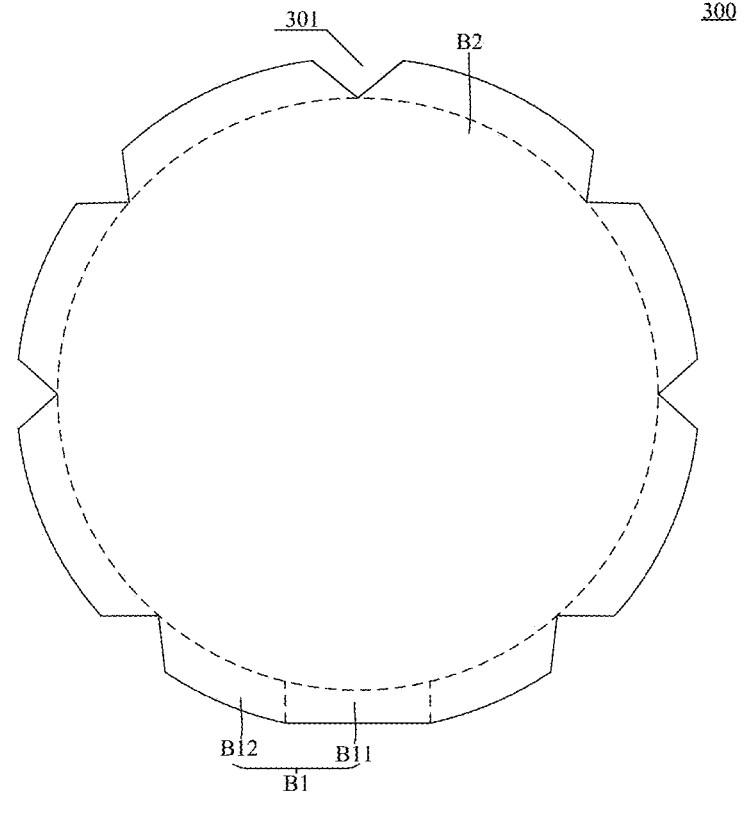
FIG. 14 is a schematic structural diagram of the metal heat-dissipation layer illustrated in FIG. 12.
FIG. 15 is a schematic structural diagram of a support layer according to some embodiments of the present disclosure.

FIG. 14 is a schematic structural diagram of the metal heat-dissipation layer illustrated in FIG. 12. In some embodiments, referring to FIG. 12 and FIG. 14, the edge portion B1 of the metal heat-dissipation layer 300 in the display module 000 includes a first edge heat-dissipation portion B11. An orthographic projection of the first edge heat-dissipation portion B11 on the protective cover 100 is within the orthographic projection of the panel bending portion 2021 on the protective cover 100, and an extension direction of a side, going away from the central portion B2 of the metal heat-dissipation layer 300, of the first edge heat-dissipation portion B11 is a linear direction. In this case, by arranging the first edge heat-dissipation portion B11 to be attached to the panel bending portion 2021, it is possible to provide good heat-dissipation for the panel bending portion 2021. In addition, the extension direction of the side, going away from the central portion B2 of the metal heat-dissipation layer 300, of the first edge heat-dissipation portion B11 is arranged to be linear, which is matched with a curved direction of the curved surface of the second sub-bending portion 1022, such that the first edge heat-dissipation portion B11 is prevented from affecting the form of the panel bending portion 2021 after being subjected to compression deformation.

In some embodiments, as illustrated in FIG. 14, the edge portion B1 of the metal heat-dissipation layer 300 further includes a second edge heat-dissipation portion B12 in addition to the first edge heat-dissipation portion B11. The plurality of hollowed-out grooves 301 in the metal heat-dissipation layer 300 are disposed on a side, going away from the central portion B2 of the metal heat-dissipation layer 300, of the second edge heat-dissipation portion B12 of the edge portion B1 of the metal heat-dissipation layer 300. In this case, because the orthographic projection of the first edge heat-dissipation portion B11 on the protective cover 100 is within the orthographic projection of the panel bending portion 2021 on the protective cover 100, the probability of full-curvature compression deformation occurring in the first edge heat-dissipation portion B11 is low, such that the hollowed-out groove 301 are not arranged in the region where the first edge heat-dissipation portion B11 is disposed, which ensures the support strength and heat-dissipation effect of this region.

In some embodiments, as illustrated in FIG. 9 and FIG. 10, the display module 000 further includes an adhesive layer 600 and a cushioning foam layer 700 that are stacked between the metal heat-dissipation layer 300 and the first panel portion 201. The adhesive layer 600 is between the cushioning foam layer 700 and the first panel portion 201, and the metal heat-dissipation layer 300 is disposed on a side, going away from the adhesive layer 600, of the cushioning foam layer 700. In this way, a super clean foam (SCF) formed by the adhesive layer 600, the cushioning foam layer 700, and the metal heat-dissipation layer 300 supports and protects the flexible display panel 200 well. In some embodiments, the adhesive layer 600 is a grid adhesive layer, and the metal heat mesh layer 300 is copper foil or other metals, which is not limited herein.

In some embodiments, as illustrated in FIG. 9, the display module 000 further includes a support layer 800. The support layer 800 is disposed between the third panel portion 203 and the first panel portion 201 of the flexible display panel 200 and attached to the third panel portion 203 and the first panel portion 201. An orthographic projection of the support layer 800 on the third panel portion 203 is within the third panel portion 203. In this case, by providing the support layer 800 between the first panel portion 201 and the third panel portion 203 of the flexible display panel 200, wherein the support layer 800 is attached to the first panel portion 201 and the third panel portion 203, the first panel portion 201 and the third panel portion 203 are ensured to be well supported, such that the panel bending portion 2021 of the second panel portion 202 is ensured to have a good form. FIG. 15 is a schematic structural diagram of a support layer according to some embodiments of the present disclosure. In some embodiments, referring to FIG. 15, the support layer 800 includes two layers of adhesive layer 801 and a buffer layer 802 between the two layers of adhesive layer 801. A side, going away from the buffer layer 802, of one of the two layers of adhesive layer 801 is attached to the metal heat-dissipation layer 300, and a side, going away from the metal heat-dissipation layer 300, of the other of the two layers of adhesive layer 801 is attached to a backside of the third panel portion 203. In some embodiments, the cushioning layer 802 is a film layer structure made of polyethylene terephthalate (PET).

In some embodiments, as illustrated in FIG. 9 and FIG. 10, a side surface, proximal to the panel bending portion 2021 of the second panel portion 202, of the support layer 800 in the display module 000 is flush with a side surface, proximal to the panel bending portion 2021, of the metal heat-dissipation layer 300. In this case, by arranging the side surface, proximal to the panel bending portion 2021, of the support layer 800 to be flush with the side surface, proximal to the panel bending portion 2021, of the metal heat-dissipation layer 300, the third panel portion 203 is well supported, such that the support effect on the panel bending portion 2021 is good, and thus a probability of undesirable phenomena such as collapse occurring to the panel bending portion 2021 is low. It should be noted that in the present disclosure, the side surface, proximal to the panel bending portion 2021, of the metal heat-dissipation layer 300, a side surface, proximal to the panel bending portion 2021, of the adhesive layer 600, and a side surface, proximal to the panel bending portion 2021, of the cushioning foam layer 700 are capable of being flush. In this way, the side surface, proximal to the panel bending portion 2021, of the support layer 800 and the side surface, proximal to the panel bending portion 2021, of the adhesive layer 600 are flush.

In some embodiments, the support layer 800 in the display module 000 is acquired by tailoring an auxiliary support film whole-layered adhered to the metal heat-dissipation layer 300 according to a dimension of the third panel portion 203 of the flexible display panel 200. In some embodiments, first, the auxiliary support film is whole-layered attached to the SCF; then, the support layer 800 is acquired by tailoring the auxiliary support film based on the dimension of the third panel portion 203; thereafter, the SCF and the support layer 800 are attached integrally to the backside of the first panel portion 201 of the flexible display panel 200; and, finally, a backside of the third panel portion 203 is attached with the support layer 800. Finally, the backside of the third panel portion 203 is attached to the support layer 800. In this way, attaching the whole layer of the auxiliary support layer to the SCF is convenient, which simplifies the process of attaching and is conducive to improving the production capacity. Alternatively, the auxiliary support film is whole-layered attached to the SCF first; then, the SCF and the auxiliary support film are integrally attached to the backside of the first panel portion 201 of the flexible display panel 200; thereafter, the backside of the third panel portion 203 is attached to the auxiliary support film; and finally, the support layer 800 is acquired by tailoring the auxiliary support film based on the dimension of the third panel portion 203. That is, the auxiliary support film is attached to the third panel portion 203 of the flexible display panel 200 before being tailored. A side surface of the support layer 800 acquired after tailoring the auxiliary support film is flush with a side surface of the third panel portion 203. In this way, a contact area between the support layer 800 and the third panel portion 203 is large, such that the support effect on the third panel portion 203 is good. In addition, by attaching the support layer 800 to the SCF as described above, a thickness of the cushioning layer 802 in the support layer 800 is appropriately reduced, such that a small elastic force is generated after the support layer 800 enters the bending portion 102 of the protective cover 100, and thus an attaching yield of the support layer 800, the flexible display panel 200, and the SCF is ensured to be high.

In some embodiments, as illustrated in FIG. 7 and FIG. 8, the bending portion 102 of the protective cover 100 further includes a transition portion 1023 between the first sub-bending portion 1021 and the second sub-bending portion 1022. A curved surface a5, proximal to of the flexible display panel 200, of the transition portion 1023 is tangent to the curved surface a1, proximal to the flexible display panel 200, of the first sub-bending portion 1021 of the bending portion 102, and tangent to the curved surface a2, proximal to the flexible display panel 200, of the second sub-bending portion 1022 of the bending portion 102. In this case, by providing the transition portion 1023 between the first sub-bending portion 1021 and the second sub-bending portion 1022 of the protective cover 100 and arranging the curved surface a5, proximal to the flexible display panel 200, of the transition portion 1023 to be tangent to the curved surface a1, proximal to the flexible display panel 200, of the first sub-bending portion 1021 and to be tangent to the curved surface a2, proximal to the flexible display panel 200, of the second sub-bending portion 1022, in the actual manufacturing process, a junction between the curved surface a1, proximal to the flexible display panel 200, of the first sub-bending portion 1021 and the curved surface a2, proximal to the flexible display panel 200, of the second sub-bending portion 1022 is prevented from generating a stress concentration point, which facilitates the processing of the protective cover 100. In the case that the orthographic projection of the other portion of the second panel portion 202 on the protective cover 100 is within the transition portion 1023, the attaching stability performance of the second panel portion 202 with the first sub-bending portion 1021, the transition portion 1023, and the second sub-bending portion 1022 is ensured to be good.

In the present disclosure, as illustrated in FIG. 8 and FIG. 11, a surface, going away from the main body portion 101 of the protective cover 100, of the transition portion 1023 of the bending portion 102 is a third table surface a6. The third table surface a6 is co-planar with the first table surface a3, going away from the main body portion 101, of the first sub-bending portion 1021, and the second table surface a4, going away from the main body portion 101, of the second sub-bending portion 1022. That is, the third table surface a6 is used to compose an annular plane. The annular plane is parallel to a surface a7, proximal to the first panel portion 201 of the flexible display panel 200, of the main body portion 101 of the protective cover 100. In some embodiments, a width of the third table surface a6, going away from the main body portion 101, of the transition portion 1023 of the bending portion 102 is gradually increased along an annular direction from the first sub-bending portion 1021 near the second sub-bending portion 1022.

In some embodiments, as illustrated in FIG. 12 and FIG. 13, a side, facing the panel bending portion 2021 of the second panel portion 202, of the second sub-bending portion 1022 of the protective cover 100 has an avoiding hole b1. In this case, by providing the avoiding hole b1 on the side, facing the panel bending portion 2021 in the second panel portion 202, of the second sub-bending portion 1022 of the protective cover 100, in the case that the panel bending portion 2021 of the second panel portion 202 is likely to touch the second sub-bending portion 1022 of the protective cover 100, an end of the panel bending portion 2021 is capable of entering into the avoiding hole b1, such that the panel bending portion 2021 is prevented from being directly contacting with the curved surface a2, proximal to the flexible display panel 200, of the second sub-bending portion 1022, and thus an undesirable phenomenon of breakage occurring to the flexible display panel 200 is avoided. In some embodiments, the avoiding hole b1 is a through hole or a blind hole, which is not limited herein.

In some embodiments, as illustrated in FIG. 9 and FIG. 10, a width of the second panel portion 202 of the flexible display panel 200 ranges from 0.1 mm to 1 mm. That is, in the display module 000 of the present disclosure, a width of the portion, extending into the bending portion 102 of the protective cover 100, of the flexible display panel 200 ranges from 0.1 mm to 1 mm. Within this width range, the flexible display panel 200 is subjected to a small force, such that the assembly yield of the flexible display panel 200 and the protective cover 100 is ensured to be high.

In some embodiments, as illustrated in FIG. 12 and FIG. 13, the protective cover 100 in the display module 000 has a central light-transmitting region c1 and an edge light-shielding region c2 disposed on a periphery of the central light-transmitting region c1. At least a portion of the edge light-shielding region c2 is within the bending portion 102 of the protective cover 100. The display module 000 further includes: a light-absorbing ink layer 900 disposed on a side, proximal to the flexible display panel 200, of the protective cover 100, and the light-absorbing ink layer 900 is within the edge light-shielding region c2 of the protective cover 100. In this case, by providing the light-absorbing ink layer 900 on the side, proximal to the flexible display panel 200, of the protective cover 100 and arranging the light-absorbing ink layer 900 to be within the edge light-shielding region c2 of the protective cover 100, the bezel of the display module 000 is modified well by the light-absorbing ink layer 900, and because the light-absorbing ink layer 900 shields the reflected light, the display effect of the display module 000 is improved. In some embodiments, the light-absorbing ink layer 900 is a black ink layer or an ink layer of other colors, which is not limited herein.

Figure 16:
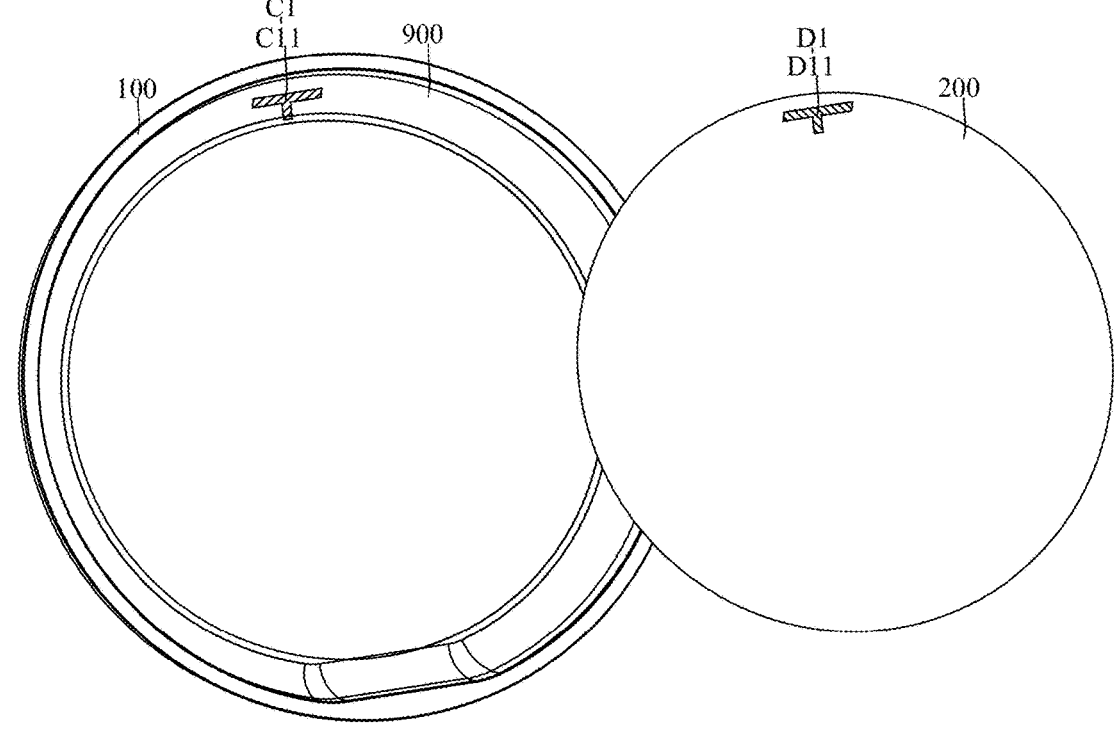
FIG. 16 is an exploded schematic diagram of a display module according to some embodiments of the present disclosure.

FIG. 16 is an exploded schematic diagram of a display module according to some embodiments of the present disclosure. In some embodiments, referring to FIG. 6, the display module 000 further includes at least one first alignment structure C1 fixed on a side, going away from the protective cover 100, of the light-absorbing ink layer 900 and at least one second alignment structure D1 fixed on a side, proximal to the protective cover 100, of the flexible display panel 200. This at least one first alignment structure C1 and the at least one second alignment structure D1 are in one-to-one correspondence. The first alignment structure C1 and the corresponding second alignment structure D1 are configured to align the protective cover 100 with the flexible display panel 200 before the protective cover 100 and the flexible display panel 200 in the display module 000 are attached. In this case, by providing the first alignment structure C1 on the side, going away from the protective cover 100, of the light-absorbing ink layer 900 and the second alignment structure D1 on the side, proximal to the protective cover 100, of the flexible display panel 200, a relative attaching position of the flexible display panel 200 and the protective cover 100 is ensured to be accurate by calibrating relative positions of the first alignment structure C1 and the second alignment structure D1. In actual practice, the relative position information of the first alignment structure C1 and the second alignment structure D1 is collected by a camera device, and then the relative positions of the flexible display panel 200 and the protective cover 100 are adjusted based on the position information, such that the flexible display panel 200 and the protective cover 100 are ensured to be well attached. In some embodiments, the number of first alignment structures C1 is one, and the number of second alignment structures D1 is also one; or the number of first alignment structures C1 is plural, and the number of second alignment structures is also plural. The plurality of first alignment structures C1 are equally spaced apart along the edge portion of the protective cover 100, and the plurality of second alignment structures D1 are equally spaced apart along the edge portion of the flexible display panel. In some embodiments, the number of first alignment structures C1 is four, and the number of second alignment structures D1 is also four, which are not limited herein.

In some embodiments, as illustrated in FIG. 16, the first alignment structure C1 secured to the side, going away from the protective cover 100, of the light-absorbing ink layer 900 includes at least one first alignment strip C11, and the second alignment structure D1 secured to the side, proximal to the protective cover 100, of the flexible display panel 200 includes at least one second alignment strip D11. The at least one first alignment strip C11 is in correspondence to the at least one second alignment strip D11. The first alignment strip C11 and the corresponding second alignment strip D11 are configured to align the protective cover 100 with the flexible display panel 200 during the process that the protective cover 100 and the flexible display panel 200 are attached. In some embodiments, the number of first alignment strips C11 is one, and the number of second alignment strips D11 is one; or the number of first alignment strips C11 is two, the number of second alignment strips D11 is two, lengthwise directions of the two first alignment strips C11 are perpendicular, and lengthwise directions of the two second alignment strips D11 are perpendicular; or the number of first alignment strips C11 is three, and the number of second alignment strips D11 is also three, wherein two of the three first alignment strips C11 are parallel, the other first alignment strip C11 is between the two first alignment strips C11 and a lengthwise direction thereof is perpendicular to lengthwise directions of the two first alignment strips C11, and two of the three second alignment strips D11 are parallel, and the other second alignment strip D11 is between the two second alignment strips D11, and a lengthwise direction thereof is perpendicular to lengthwise directions of the two second alignment strips D11. It should be noted that the shape and the number of first alignment strips C11 in the first alignment structure C1, and the shape and the number of second alignment strips D11 in the second alignment structure D1 are not limited herein.

In some embodiments, the first alignment structure C1 fixed on the side, going away from the protective cover 100, of the light-absorbing ink layer 900 is made of an ink material, and the first alignment structure C1 and the light-absorbing ink layer 900 are in different colors, which facilitates the identification of the first alignment structure arranged on the light-absorbing ink layer 900. In some embodiments, the color of the light-absorbing ink layer 900 is black, and the first alignment structure C1 is made of a white ink material. It should be noted that in other possible embodiments, the light-absorbing ink layer 900 and the first alignment structure C1 are in other colors, as long as the colors of the two are different, which is not limited herein. The second alignment structure D1 fixed on the side, proximal to the protective cover 100, of the flexible display panel 200 is made of polyimide (PI) or metal stamping, which is not limited herein.

In some embodiments, the flexible display panel 200 in the display module 000 has a display region d1 and a non-display region d2 disposed on a periphery of this display region d1. A boundary of an orthographic projection of the display region d1 of the flexible display panel 200 on the protective cover 100 is overlapped with a boundary of the central light-transmitting region c1 of the protective cover 100. Typically, three possible embodiments are hereinafter introduced to describe positions where the display region d1 and the non-display region d2 of the flexible display panel 200 are disposed in the protective cover 100.

Figure 17:
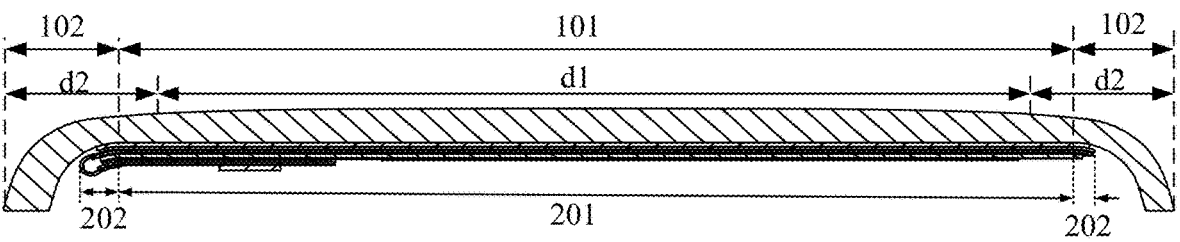
FIG. 17 is a cross-sectional view of a display module according to some embodiments of the present disclosure.

In a first embodiment, referring to FIG. 13 and FIG. 17 which is a cross-sectional view of a display module, a portion of an orthographic projection of the non-display region d2 of the flexible display panel 200 on the protective cover 100 is within the bending portion 102 of the protective cover 100, and the other portion is within the main body portion 101 of the protective cover 100.

Figure 18:
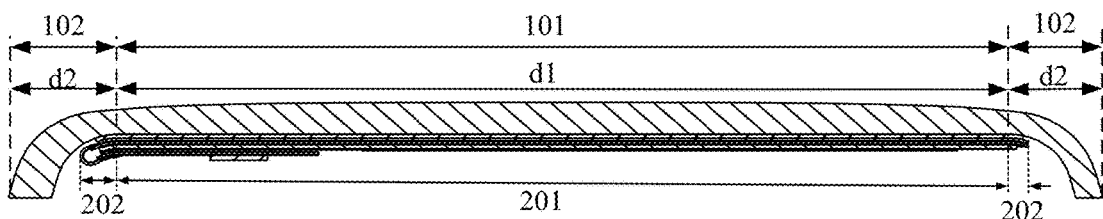
FIG. 18 is a cross-sectional view of another display module according to some embodiments of the present disclosure.

In a second embodiment, referring to FIG. 18 which is a cross-sectional view of another display module, all of the orthographic projection of the non-display region d2 of the flexible display panel 200 on the protective cover 100 is within the bending portion 102 of the protective cover 10, and all of the orthographic projection of the display region d1 of the flexible display panel 200 on the protective cover 100 is within the main body portion 101 of the protective cover 100.

Figure 19:
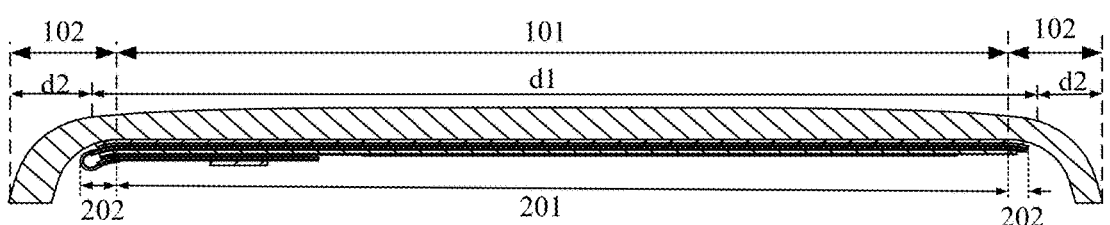
FIG. 19 is a cross-sectional view of yet another display module according to some embodiments of the present disclosure.

In a third embodiment, referring to FIG. 19 which is a cross-sectional view of yet another display module, all of the orthographic projection of the non-display region d2 of the flexible display panel 200 on the protective cover 100 is within the bending portion 102 of the protective cover 100, and a portion of the orthographic projection of the display region d1 of the flexible display panel 200 on the protective cover 100 is within the bending portion 102 of the protective cover 100. In this case, by providing a portion of the orthographic projection of the display region d1 of the flexible display panel 200 on the protective cover 100 to be within the bending portion 102 of the protective cover 100, the bending portion 102 of the protective cover 100 is also capable of displaying images.

In some embodiments, as illustrated in FIG. 19, in the case that all of the orthographic projection of the non-display region d2 of the flexible display panel 200 on the protective cover 100 is within the bending portion 102 of the protective cover 100, and a portion of the display region d1 of the flexible display panel 200 on the protective cover 100 is within the bending portion 102 of the protective cover 100, a width of the portion of the orthographic projection of display region d1 of the flexible display panel 200 that is within the bending portion 102 of the protective cover 100 ranges from 0.1 mm to 0.2 mm. In this case, by arranging the width of the portion of the orthographic projection of display region d1 of the flexible display panel 200 that is within the bending portion 102 of the protective cover 100 to range from 0.1 mm to 0.2 mm, this portion of the flexible display panel 200 is subjected to a small force within this range of width, such that the display effect of the display region d1 within this width range is ensured to be good.

Figure 20:
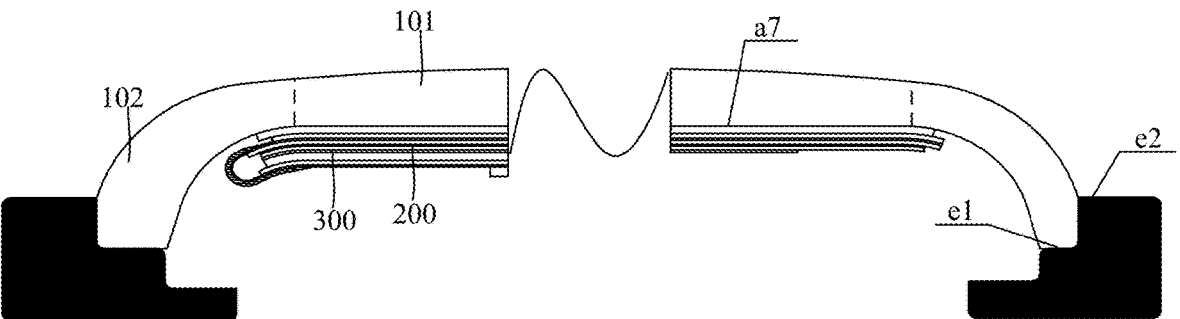
FIG. 20 is an assembling schematic diagram of a protective cover and a housing according to some embodiments of the present disclosure.

FIG. 20 is an assembling schematic diagram of a protective cover plat and a housing according to some embodiments of the present disclosure. In some embodiments, referring to FIG. 20, the protective cover 100 of the display module 000 has a first assembly surface e1 and a second assembly surface e2 perpendicular to the first assembly surface e1. The first assembly surface e1 of the protective cover 100 is a surface, going away from the main body portion 101, of the bending portion 102 of the protective cover 100. In a direction of a display surface of the flexible display panel 200, the second assembly surface of the protective cover 100 e2 is disposed on a side, going away from the flexible display panel 200, of the protective cover 100. Both the first assembly surface e1 and the second assembly surface e2 of the protective cover 100 are used to be assembled with a housing (not illustrated in the figures). In some embodiments, both the first assembly surface e1 and the second assembly surface e2 are annular planar surfaces. In this way, after the display module 000 is integrated into the display device, the protective cover 100 is assembled with the housing in the display device by the first assembly surface e1 and the second mating surface e2, such that an assembly area of the protective cover 100 and the housing is increased, and thus an assembly precision and an assembly stability of the display module 000 and the housing in the display device are good. In some embodiments, the first assembly surface e1 of the protective cover 100 is parallel to the surface a7, proximal to the first panel portion 201 of the flexible display panel 200, of the main body portion 101 of the protective cover 100.

Figures 21, 22:
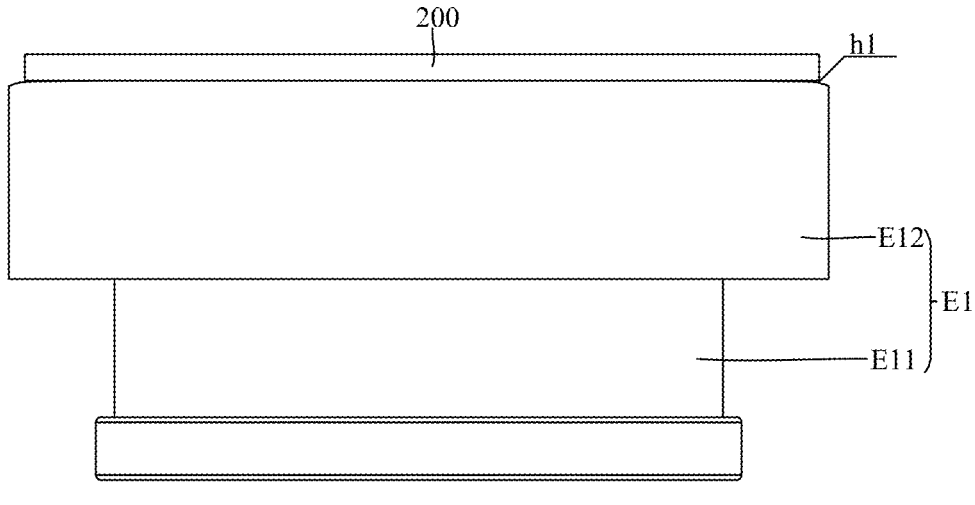
FIG. 21 is a front view of a support base for supporting a flexible display panel according to some embodiments of the present disclosure.
FIG. 22 is a side view of the support base illustrated in FIG. 21.
Figure 23:
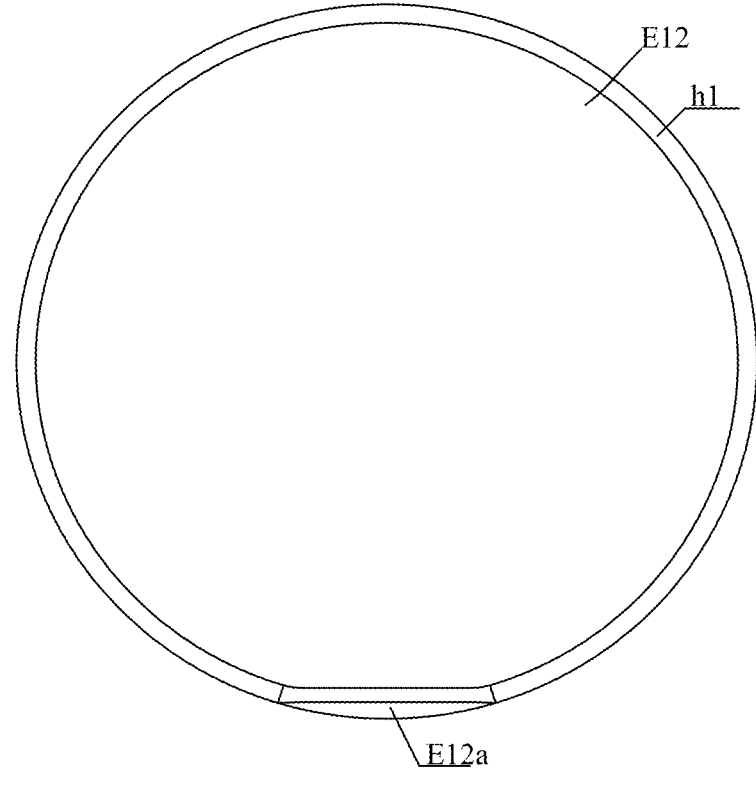
FIG. 23 is a top view of the support base illustrated in FIG. 21.

The attaching process of the protective cover 100 and the flexible display panel 200 in the display module 000 is described hereinafter. In the case that the protective cover 100 is formed by injection molding, hot bending, and machining processing, to allow the protective cover 100 to be well attached to the flexible display panel 200, the flexible display panel 200 is supported by a support base 800. FIG. 21 is a front view of a support base for supporting a flexible display panel according to some embodiments of the present disclosure. FIG. 22 is a side view of the support base illustrated in FIG. 21. FIG. 23 is a top view of the support base illustrated in FIG. 21. Referring to FIG. 21, FIG. 22, and FIG. 23, the support base E1 includes a support base body E11 and a cylindrical profiling portion E12 connected to the support base body E11. The flexible display panel 200 is placed on a side, going away from the support base body E11, of the profiling portion E12. In some embodiments, the protective cover 100 is placed on the light-exit side of the flexible display panel 200, and a downward force perpendicular to the protective cover 100 is applied to the protective cover 100; the flexible display panel 200 undergoes a profiling deformation, which matches the shape of the protective cover 100, within the protective cover 100, such that the second panel portion 202 of the flexible display panel 200 extends into the bending portion 102 of the protective cover 100. In addition, to ensure that the panel bending portion 2021 of the second panel portion 202 extends smoothly toward the bending portion 102 within the protective cover 100 during the attaching process, and to avoid generating a large compressive stress during the extension process, it is necessary to provide an avoiding region E12a at a side surface of the profiling portion E12. Further, to prevent an edge of the profiling portion E12 from generating a large compressive stress on the backside of the flexible display panel 200, an edge of a side, going away from the support base body E11, of the profiling portion E12 is arranged with a fillet h1. In some embodiments, the profiling portion E12 of the support base E1 is a cylindrical structure made of a rubber material.

In summary, some embodiments of the present disclosure provide a display module, including: the protective cover, the flexible display panel, and the metal heat-dissipation layer. The protective cover in the display module is arranged on the light-exit side of the flexible display panel. Because the orthographic projection of the edge portion of the flexible display panel on the protective cover is within the bending portion of the protective cover, the edge portion of the flexible display panel is capable of being extended into the bending portion of the protective cover. In this way, after the flexible display panel is attached to the protective cover, the overall bezel of the acquired display module is narrow and the large screen-to-body ratio is large, which improves the user experience. After the display module is integrated into the display device, the overall bezel of the display device is caused to be small, such that an effect of modifying the display device is improved. In addition, the metal heat-dissipation layer is arranged on the side, going away from the protective cover, of the flexible display panel, and the edge portion of the metal heat-dissipation layer is within the bending portion of the protective cover. Therefore, after the edge portion of the metal heat-dissipation layer extends into the bending portion of the protective cover, the plurality of hollowed-out grooves arranged in the edge portion of the metal heat-dissipation layer effectively reduce the probability of the edge portion of the metal heat-dissipation layer generating the undesirable phenomenon of wrinkles, such that the overall flatness of the flexible display panel that is attached to the metal heat-dissipation layer is ensured to be good.

Some embodiments of the present disclosure further provide a display device. The display device is a smartphone, a tablet computer, a television, a monitor, a laptop computer, a digital photo frame, a navigator, and any other product with a display function or a device body in a wearable device. In some embodiments, in the case that the display device is a device body in a wearable device, the display device is a watch or a bracelet. The display device includes a power supply component (not illustrated in the accompanying drawings) and a display module 000, wherein the display module 000 is any of the display modules illustrated in the above embodiments. The power supply component is connected to the display module 000 and configured to supply power to the display module 000, such that the display module 000 is capable of displaying images.

Figure 24:
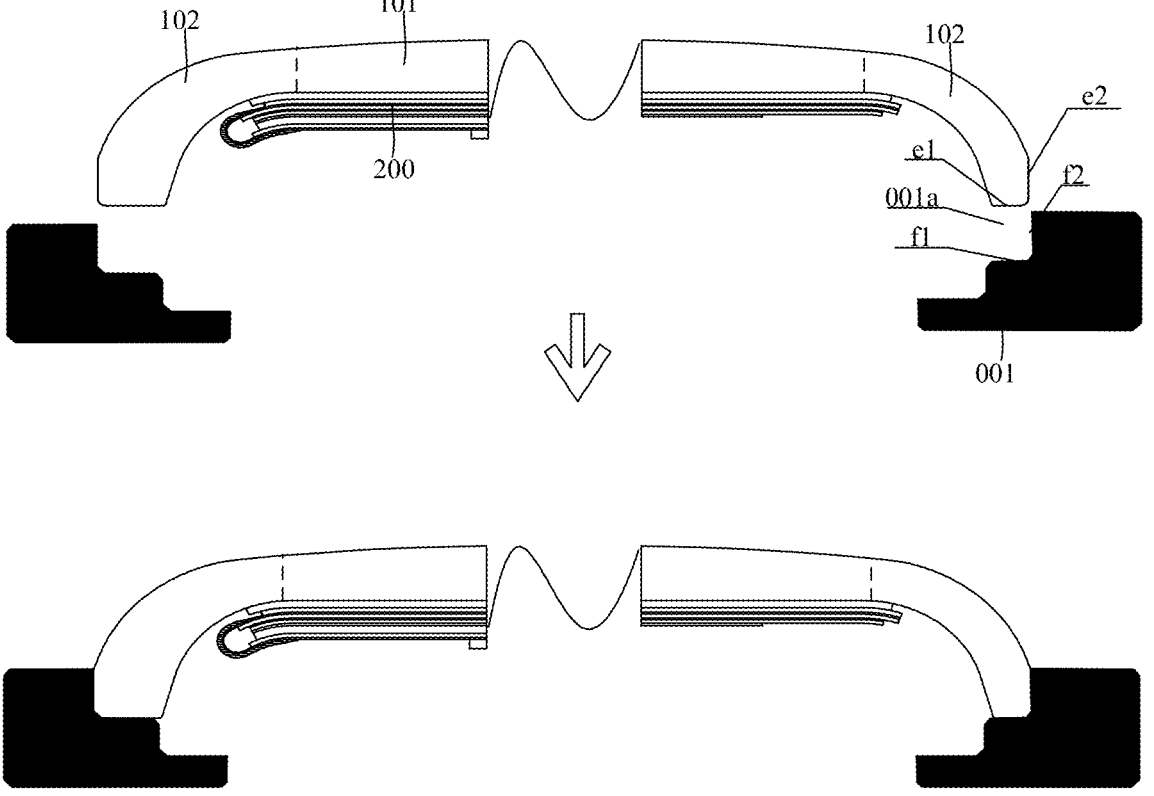
FIG. 24 is a cross-sectional view of a display device according to some embodiments of the present base.

FIG. 24 is a cross-sectional view of a display device according to some embodiments of the present base. In some embodiments, referring to FIG. 24, in the case that a protective cover in the display module has a first assembly surface e1 and a second assembly surface e2, the display device further includes a housing 001, which has an annular mounting groove 001a. The mounting groove 001a in the housing 001 has a bottom surface f1 connecting to the first assembly surface e1 of the protective cover 100 and a side surface f2 connecting to the second assembly e2 of the protective cover 100. Thus, after the display module 000 is integrated into the display device, the protective cover 100 and the housing 001 are assembled by the first assembly surface e1 and the second assembly surface e2 of the protective cover 100 and the bottom surface f1 and the side surface f2 of the housing 001 in the display device, such that an assembly area of the protective cover 100 and the housing 001 is increased, and thus an assembly precision and an assembly stability of the display module 000 and the housing 001 of the display device are ensured.

It should be noted that in the accompanying drawings, the sizes of layers and regions may be exaggerated for clearer illustration. It should be understood that where an element or layer is referred to as being "on" another element or layer, the element or layer may be directly on another element, or intervening layers therebetween may be present. In addition, it should be understood that where an element or layer is referred to as being "under" another element or layer, the element or layer may be directly under the other element, or there may be more than one intervening layer or element. In addition, it may be further understood that in the case that a layer or element is referred to as being "between" two layers or two elements, the layer may be the only layer between the two layers or two elements, or more than one intervening layer or element may further be present. Like reference numerals indicate like elements throughout.

In the present disclosure, the terms "first" and "second" are only used for descriptive purposes, and cannot be understood as indicating or implying relative importance. The term "a plurality of" refers to two or more, unless expressly defined otherwise.

Described above are merely exemplary embodiments of the present disclosure, and are not intended to limit the present disclosure. Therefore, any modifications, equivalent substitutions, improvements, and the like made within the spirit and principles of the present disclosure shall be included in the protection scope of the present disclosure.

What is claimed is:

1. A display module, comprising: a protective cover, a flexible display panel, and a metal heat-dissipation layer; wherein the protective cover comprises: a main body portion in the shape of a circular plate and a bending portion distributed around the main body portion, the bending portion being fixedly connected to an edge of the main body portion;

a light-exit side of the flexible display panel is attached to the protective cover, and an orthographic projection of an edge portion of the flexible display panel on the protective cover is within the bending portion; and the metal heat-dissipation layer is attached to a side, going away from the protective cover, of the flexible display panel, an orthographic projection of an edge portion of the metal heat-dissipation layer on the protective cover is within the bending portion, and the edge portion of the metal heat-dissipation layer has a plurality of hollowed-out grooves arranged in arrays.

2. The display module according to claim 1, wherein the hollowed-out groove is disposed on a side, going away from a central portion of the metal heat-dissipation layer, of the edge portion of the metal heat-dissipation layer.

3. The display module according to claim 2, wherein a width of the hollowed-out groove gradually decreases along a direction from the edge portion to the central portion of the metal heat-dissipation layer.

4. The display module according to claim 3, wherein the plurality of hollowed-out grooves are in the shape of at least one of a triangle, a trapezoid, or a bow.

5. The display module according to claim 2, wherein the plurality of hollowed-out grooves are equally spaced around the central portion of the metal heat-dissipation layer.

6. The display module according to claim 1, wherein an orthographic projection of the hollowed-out groove on the protective cover is outside the main body portion.

7. The display module according to claim 1, wherein the flexible display panel comprises a first panel portion attached to the main body portion, a second panel portion distributed around the first panel portion, and a third panel portion fixedly connected to a side, going away from the first panel portion, of the second panel portion; wherein a boundary of an orthographic projection of the first panel portion on the protective cover is overlapped with a boundary of the main body portion, an orthographic projection of the second panel portion on the protective cover is within the bending portion, and the third panel portion is configured to be bonded to a driver component.

8. The display module according to claim 7, wherein the second panel portion comprises a panel bending portion, the panel bending portion being fixedly connected to the third panel portion; and the bending portion comprises a first sub-bending portion and a second sub-bending portion, wherein an extension direction of a curved surface, proximal to of the flexible display panel, of the first sub-bending portion is a curved direction, and an extension direction of a curved surface, proximal to of the flexible display panel, of the second sub-bending portion is a linear direction;

wherein an orthographic projection of the panel bending portion of the second panel portion on the protective cover is at least within the second sub-bending portion, and an orthographic projection of the other portion of the second panel portion on the protective cover is at least within the first sub-bending portion.

9. The display module according to claim 8, wherein the orthographic projection of the hollowed-out groove on the protective cover is not overlapped with the orthographic projection of the panel bending portion on the protective cover.

10. The display module according to claim 8, wherein the edge portion of the metal heat-dissipation layer comprises a first edge heat-dissipation portion, wherein an orthographic projection of the first edge heat-dissipation portion on the protective cover is within the orthographic projection of the panel bending portion on the protective cover, and an extension direction of a side, going away from the central portion of the metal heat-dissipation layer, of the first edge heat-dissipation portion is a linear direction.

11. The display module according to claim 10, wherein the edge portion of the metal heat-dissipation layer further comprises a second edge heat-dissipation portion in addition to the first edge heat-dissipation portion, and the plurality of hollowed-out grooves are disposed on a side, going away from the central portion of the metal heat-dissipation layer, of the second edge heat-dissipation portion.

12. The display module according to claim 8, further comprising: a support layer, the support layer being disposed between the third panel portion and the first panel portion and attached to the third panel portion and the first panel portion;

wherein an orthographic projection of the support layer on the third panel portion is within the third panel portion.

13. The display module according to claim 12, wherein a side surface, proximal to the panel bending portion, of the support layer is flush with a side surface, proximal to the panel bending portion, of the metal heat-dissipation layer.

14. The display module according to claim 13, wherein the support layer is acquired by tailoring an auxiliary support film whole-layered adhered to the metal heat-dissipation layer according to a dimension of the third panel portion.

15. The display module according to claim 14, wherein the auxiliary support film is configured to be adhered to the third panel portion prior to being tailored; and a side surface of the support layer is flush with a side surface of the third panel portion.

16. The display module according to claim 8, wherein the bending portion further comprises a transition portion between the first sub-bending portion and the second sub-bending portion, wherein a curve surface, proximal to the flexible display panel, of the transition portion is tangent to the curved surface, proximal to the flexible display panel, of the first sub-bending portion, and tangent to the curved surface, proximal to the flexible display panel, of the second sub-bending portion.

17. The display module according to claim 1, wherein the protective cover comprises a central light-transmitting region and an edge light-shielding region disposed on a periphery of the central light-transmitting region, at least a portion of the edge light-shielding region being within the bending portion; and the display module further comprises a light-absorbing ink layer disposed on a side, proximal to the flexible display panel, of the protective cover, the light-absorbing ink layer being within the edge light-shielding region.

18. The display module according to claim 17, further comprising: at least one first alignment structure fixed on a side, going away from the protective cover, of the light-absorbing ink layer and at least one second alignment structure fixed on a side, proximal to the protective cover, of the flexible display panel, the at least one first alignment structure being in correspondence to the at least one second alignment structure;

wherein the first alignment structure and the corresponding second alignment structure are configured to align the protective cover with the flexible display panel prior to the protective cover being attached to the flexible display panel.

19. The display module according to claim 18, wherein the first alignment structure is made of an ink material, and the first alignment structure and the light-absorbing ink layer are in different colors.

20. A display device, comprising: a power supply component and a display module, wherein the display module comprises: a protective cover, a flexible display panel, and a metal heat-dissipation layer; wherein the protective cover comprises: a main body portion in the shape of a circular plate and a bending portion distributed around the main body portion, the bending portion being fixedly connected to an edge of the main body portion;

a light-exit side of the flexible display panel is attached to the protective cover, and an orthographic projection of an edge portion of the flexible display panel on the protective cover is within the bending portion; and the metal heat-dissipation layer is attached to a side, going away from the protective cover, of the flexible display panel, an orthographic projection of an edge portion of the metal heat-dissipation layer on the protective cover is within the bending portion, and the edge portion of the metal heat-dissipation layer has a plurality of hollowed-out grooves arranged in arrays; and the power supply component is configured to supply power to the display module.

\* \* \* \* \*